United States Patent
Sasaki et al.

(10) Patent No.: US 7,113,311 B2
(45) Date of Patent: Sep. 26, 2006

(54) FACSIMILE COMMUNICATION METHOD

(75) Inventors: Tsutomu Sasaki, Tokyo (JP); Wataru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 993 days.

(21) Appl. No.: 10/022,293

(22) Filed: Dec. 13, 2001

(65) Prior Publication Data
US 2002/0080412 A1   Jun. 27, 2002

(30) Foreign Application Priority Data
Dec. 13, 2000   (JP)   ............................. 2000-378228

(51) Int. Cl.
*H04N 1/00*   (2006.01)
(52) U.S. Cl. ....................... 358/407; 358/405; 358/438
(58) Field of Classification Search ................. 358/400
See application file for complete search history.

(56) References Cited

U.S. PATENT DOCUMENTS

| | | | | |
|---|---|---|---|---|
| 5,377,017 | A * | 12/1994 | Lam | 358/405 |
| 5,440,405 | A * | 8/1995 | Ahmed | 358/435 |
| 5,877,870 | A * | 3/1999 | Sakai | 358/438 |
| 5,883,723 | A * | 3/1999 | Sakata | 358/442 |
| 6,005,675 | A * | 12/1999 | Maeda et al. | 358/442 |
| 6,020,981 | A * | 2/2000 | Ogiyama | 358/434 |
| 6,112,072 | A * | 8/2000 | Stiegler et al. | 455/343.3 |
| 6,437,870 | B1 * | 8/2002 | Yoshida et al. | 358/1.15 |
| 6,522,429 | B1 * | 2/2003 | Endo | 358/400 |
| 2001/0040702 | A1 * | 11/2001 | Leung | 358/434 |
| 2001/0053001 | A1 * | 12/2001 | Numata | 358/468 |
| 2002/0054368 | A1 * | 5/2002 | Chimura et al. | 358/407 |

FOREIGN PATENT DOCUMENTS

| | | |
|---|---|---|
| JP | 8-116418 | 5/1996 |
| JP | 9-508771 | 9/1997 |
| JP | 10-285370 | 10/1998 |
| JP | 11-261786 | 9/1999 |
| JP | 11-308428 | 11/1999 |
| KR | 2000-66658 | 11/2000 |
| WO | WO 99/12342 | 3/1999 |

* cited by examiner

*Primary Examiner*—Kimberly Williams
*Assistant Examiner*—Ashish K. Thomas
(74) *Attorney, Agent, or Firm*—Scully, Scott, Murphy & Presser, P.C.

(57) ABSTRACT

A facsimile transmission control procedure for a relay use to relay facsimile communication via a public telephone network between mobile communication control units placed at different places from one another in which such facsimile communication is implemented by the use of a radio link wherein non-standard facilities signal NSF and non-standard facilities set-up signal NSS defined by the Recommendation T.30 are used to identify another communicating party; if the other communicating party can apply a transmission control procedure of the invention, communication is conducted in accordance with such independent transmission control procedure, while if it is not, the communication is made based on the standard Recommendation T.30; and in the independent transmission control procedure, a time margin of each preamble, which is to be added to each of all the binary code signals used in the communication on and after an exchange of NSF and NSS between transmission and reception sides was executed, is reduced to a predetermined time.

24 Claims, 13 Drawing Sheets

FIG. 13

| BREVITY CODE | NAME OF SIGNAL | FULL SPELLING | FACILITIES |
|---|---|---|---|
| CFR | CONFIRMATION TO RECEIVE SIGNAL | Confirmation to Receive | RESPONSE SIGNAL TO INDICATE APPROVE OF STARTING TO DELIVER MESSAGE AFTER COMPLETING PROCEDURE PRIOR TO MESSAGE DELIVERY |
| CSI | CALLED SUBSCRIBER IDENTIFICATION SIGNAL | Called Subscriber Identification | NUMBER OF CALLED SUBSCRIBER |
| DCN | DISCONNECTION COMMAND | Disconnect | INDICATING START OF PHASE E |
| DCS | DIGITAL COMMAND SIGNAL | Digital Command Signal | COMMAND SIGNAL INDICATING FACILITIES SET UP AMONG STANDARD FACILITIES DESIGNATED BY DIS SIGNAL |
| DIS | DIGITAL IDENTIFICATION SIGNAL | Digital Identification Signal | INDICATING THAT CALLED SUBSCRIBER HAS RECEPTION FACILITIES BASED ON ITU-T STANDARD |
| EOP | END OF PROCEDURE SIGNAL | End of Procedure | INDICATING THAT THERE IS NO TRANSMITTING DOCUMENT (GOING ON PHASE E) |
| MCF | MESSAGE CONFIRMATION SIGNAL | Message Confirmation | INDICATING THAT MESSAGE WAS COMPLETELY RECEIVED |
| MPS | MULTIPAGE SIGNAL | Multipage Signal | INDICATING COMPLETION OF PAGE FOR FACSIMILE MESSAGE (PROCEDURE RETURNS TO STARTING OF PHASE C) |
| NSF | NON-STANDARD FACILITIES IDENTIFICATION SIGNAL | Non-Standard Facilities | FOR IDENTIFYING DEMAND OF SPECIFIC USER OTHER THAN THAT OF ITU-T RECOMMENDATION |
| NSS | NON-STANDARD FACILITIES SET-UP SIGNAL | Non-Standard Facilities Set-up | COMMAND SIGNAL INDICATING FACILITIES USED ACTUALLY IN COMMUNICATION AMONG NON-STANDARD FACILITIES |
| RNR | RECEIVE NOT READY SIGNAL | Receive Not Ready | INDICATING THAT NO MORE DATA CANNOT RECEIVED BY RECEPTION SIDE |
| TCF | TRAINING CHECK SIGNAL | Training Check | CONFIRMING TRAINING OF MODEM BY WHICH FACSIMILE MESSAGE IS RECEIVED, AND CHECKING WHETHER CHANNEL CAN BE USED AT THIS TRANSMISSION RATE |
| TSI | TRANSMITTING SUBSCRIBER IDENTIFICATION SIGNAL | Transmitting Subscriber Identification | NUMBER OF TRANSMITTING SUBSCRIBER |
| CRP | COMMAND REPEAT SIGNAL | Command Repeat | SINCE PRIOR COMMAND WAS ERRONEOUSLY RECEIVED, REPEAT OF ALL COMMANDS IS REQUESTED |

FACSIMILE COMMUNICATION METHOD

FIELD OF THE INVENTION

The present invention relates to a facsimile communication method, and particularly to a non-standard facsimile communication method, which is conducted by utilizing non-standard facilities signal NSF (hereinafter referred simply to as "NSF") and non-standard facilities set-up signal NSS (hereinafter referred simply to as "NSS") based upon ITU-T Recommendation T30. More specifically, the present invention relates to a facsimile transmission control procedure for relay use through a public telephone network or the like in the case where facsimile information from a mobile terminal via a radio link is relayed by mobile communication control units, which have been placed at different places from one another.

BACKGROUND OF THE INVENTION

An example of such facsimile communication system as described above is shown in a schematic block diagram of FIG. 1. Since the communication system shown in FIG. 1 is the same as an outlined system configuration to which the present invention is to be applied, the prior art will be described hereinafter by referring to FIG. 1.

In FIG. 1, facsimile terminals 1, 2, 3, and 4 are those standardized in accordance with ITU-T Recommendations T.4 and T.30, and these facsimile terminals conduct facsimile communications with each other through mobile terminals 5, 6, and 7, a multiplexed radio link, mobile communication control units 8, and 9, and a public telephone network 10.

The mobile terminal 5 functions to connect the facsimile terminal 1 to the mobile communication control unit 8. The mobile terminal 5 transmits to and receives from the facsimile terminal 1 transmission control procedure signal as well as image signal of analog signal. Furthermore, the mobile terminal 5 converts these analog signals transmitted from the facsimile terminal 1 into radio signals as a result of encoding digitally these signals, and transmits these encoded signals to the mobile communication control unit 8 through the multiplexed radio link. On one hand, the mobile terminal 5 receives facsimile transmission control procedure signal and image signal of radio signal, which have been digitally encoded and transmitted from the mobile communication control unit 8. These signals received are converted into analog signals to be transmitted to the facsimile terminal 1 in the mobile terminal 5. The same operations as that described above are implemented also in the mobile terminals 6 and 7, respectively.

The mobile communication control unit 8 is connected with the facsimile terminal 4 and the mobile communication control unit 9 through the public telephone network 10. The mobile communication control unit 8 implements a digital facsimile communication via a multiplexed radio link, while it makes an analog facsimile communication with the facsimile terminal 4 through the public telephone network 10. The mobile communication control unit 9 conducts also the same operations as that described above in the mobile communication control unit 8.

In the mobile communication control unit 8, radio communication equipment 81 receives facsimile transmission control procedure signals and image signals, which have been digitally encoded, of radio signals transmitted from the mobile terminal 5 through a multiplexed radio link, and transmits these signals to a communication control device 82. Furthermore, the radio communication equipment 81 receives facsimile transmission control procedure signals and image signals, which are transmitted from the communication control device 82 and have been digitally encoded, and converts these signals into radio signals to transmits to the mobile terminal 5 via a multiplexed radio link.

The communication control device 82 is connected with the facsimile terminal 4 through a trunk circuit 84 and the public telephone network 10, and transmits to and receives from the facsimile terminal 4 facsimile transmission control procedure signals and image signals of analog signals. Moreover, the communication control device 82 receives facsimile transmission control procedure signals and image signals of analog signal, which are transmitted from the facsimile terminal 4, and converts these signals into digitally encoded signals to deliver the encoded signals to the radio communication unit 81. Besides, the communication control device 81 converts facsimile transmission control procedure signals and image signals, which are delivered from the radio communication equipment 81 and have been digitally encoded into analog signals defined by the Recommendations T.4 and T.30 to transmit these analog signals to the facsimile terminal 4.

There are three types of connection mode in which facsimile terminals are connected with each other. A first connection mode is the one wherein the facsimile terminal 1 is connected with the facsimile terminal 4 through the mobile terminal 5, the mobile communication control unit 8, and the public telephone network 10. A second connection mode is the one wherein the facsimile terminal 1 is connected with the facsimile terminal 3 through the mobile terminals 5 and 7, the mobile communication control units 8 and 9, and the public telephone network 10. A third connection mode is the one wherein the facsimile terminal 1 is connected with the facsimile terminal 2 through the mobile terminals 5 and 6, the mobile communication control unit 8, and the public telephone network 10.

In case of the third connection mode, the facsimile terminals 1 and 2 are connected with the communication control units 82 and 83, respectively, and the trunk circuits 84 and 85 are connected with each other via the public telephone network 10. Such turn-back connecting mode of trunk line involves two types of manner, i.e., one of them is a case wherein the trunk line is turned back in a separate network (the public telephone network 10 in this example) outside the mobile communication control unit 8, and the other is a case wherein the trunk line is turned back in the mobile communication control unit 8 as shown in FIG. 1.

In the first connection mode, a facsimile transmission control procedure between the communication control device 82 and the facsimile terminal 4 must be based on the Recommendation T.30. In the second and the third connection modes, there is no recommendation defined specifically as a standard relating to a facsimile transmission control procedure for relay use passing through a trunk circuit, but a procedure based on the Recommendation T.30 is usually employed. In such connection modes, however, there is a delay derived from influences due to erroneous redelivery control and the like between a transmission and its response in a mobile communication control unit including a radio link. Accordingly, when the procedure based on the Recommendation T.30 is used with no modification, there is a possibility of a breakdown in communication.

The present invention provides a facsimile transmission control procedure for relay use for solving the problem described above, and it relates to a facsimile transmission control procedure for relay use passing through a trunk line in the second and the third connection modes.

In the following, a facsimile transmission control procedure for relay use in the above-described second and third connection modes in a conventional mobile communication control unit will be described by referring to FIG. 8. FIG. 8 is a diagram showing a communication sequence in the case where a procedure based on the Recommendation T.30 is used as the one for facsimile transmission control for relay use between mobile communication control units.

After connecting a communication line via mobile communication control units 8 and 9 including a radio link, and a public telephone network 10 between a transmit terminal (a facsimile terminal 1 in this case) and a receive terminal (a facsimile terminal 3 in this case), the transmit terminal delivers a calling signal CNG (hereinafter referred to as "CNG tone"), while the receive terminal transmits a called subscriber identification signal CED (hereinafter referred to as "CED tone").

Such CNG tone and CED tone are relayed in the mobile communication control units 8 and 9, and they are transmitted to the receive terminal and the transmit terminal, respectively. These tones are not relayed inside the mobile communication control units 8 and 9 as they are, but they are relayed in both the units 8 and 9 after they were converted into digital signals, which indicate that these tones were detected by the communication control devices 82 and 92 in both the units. The receive terminal delivers NSF, CSI, and DIS constituted into frames, respectively, following to the CED tone.

It is to be noted that these NSF, CSI, and DIS are signals defined by the above-described Recommendation, and these signals in addition to the other names of signals are indicated in FIG. 13 by their full spellings and facilities.

The term DIS means a signal for notifying all the facilities, i.e., a facsimile group number, transmission and reception facilities, a terminal constant and the like involved in a receive terminal to a transmit terminal. It is to be further noted that operations of from line connection to reception of DIS by a transmit terminal must be completed within a period of time T1. The transmit terminal transmits NSS, TSI, and DCS to a side of the receive terminal after receiving the NSF, the CSI, and the DIS, and appoints a facility selected from among facilities indicated by DIS by the use of DCS. In this case, operations of from line connection to reception of DCS by a receive terminal must be completed within the period of time T1.

The transmit terminal transmits a training check signal TCF after transmitting DSC, and checks whether or not the other facsimile terminal by which an image signal (facsimile message signal) is to be received can communicate at a transmission rate selected by DCS.

The mobile communication control unit 8 is not allowed to pass TCF through its system, but does relay only NSS, TSI, and DCS. The mobile communication control unit 9 produces TCF to transmit it to a receive terminal after transmitting DCS to the receive terminal. When the receive terminal receives normally TCF and completes a preparation for receiving a message, it delivers CFR being a response signal representing to the effect that a delivery of message may be started.

The mobile communication control unit 8 transmits CFR to the transmit terminal in the case when the mobile communication control unit 8 receives normally the TCF transmitted from the transmit terminal and receives the CFR from the receive terminal. In this case, it is to be noted that operations of from transmission of the TCF to reception of the CFR in the transmit terminal must be completed within a period of time T4. When the transmit terminal does not receive any CFR within the time T4, it delivers again NSS, TSI, and DCS. The number of times for redelivery of CFR is fixed up to two, and when the transmit terminal does not receive CFR within the time T4 after a second time redelivery of CFR, in other words, a third time transmission of CFR, the transmit terminal transmits DCN to stop the communication.

The transmit terminal transmits an image signal based on the Recommendation T.4 within a period of time T2 after receiving CFR. When completing transmission of the image signal, the transmit terminal delivers EOP and notifies a completion of a page of the image signal as well as a fact to the effect that there is no other documents to be transmitted. The receive terminal waits EOP for the time T2 after receiving the image signal, and disconnects the line in the case where no EOP is received within the time T2.

When the receive terminal receives EOP within the time T2, it delivers to the transmit terminal MCF representing a fact that the image signal has been completely received in an acknowledgement of the EOP. It is to be noted that operations of from transmission of EOP to reception of MCF in the transmit terminal must be completed within the time T4. The transmit terminal redelivers EOP in the case when it receives no MCF within the time T4. The number of times for redelivery of EOP is fixed up to two, and when the transmit terminal does not receive MCF within the time T4 after a second time redelivery of MCF, in other words, a third time transmission of MCF, the transmit terminal transmits DCN to stop the communication.

When the transmit terminal receives MCF, it transmits DCN to the receive terminal to disconnect the line. Operations of from transmission of MCF to reception of DCN by the receive terminal are effected within the time T2.

As is apparent from the above, a strict temporal restriction from transmission of a command signal to reception of a response signal (T1 through T4) is requested in a facsimile communication in accordance with a transmission control procedure based on the Recommendation T.30, and at the same time, when it acts against such temporal restriction, a command signal is retransmitted, whereby it coops with communication troubles such as disappearance of a procedure signal due to data errors arising on a transmission path or an outage of line.

FIG. 9 is a diagram showing a format of a procedure control signal represented by binary code signals. In FIG. 9, although NSF, CSI, and DIS have been shown, but the other procedure control signals are the same as the former procedure control signals described above. The format shown in FIG. 9 is composed of preambles and control signals represented by binary code. In FIG. 9, the binary code is composed of respective frames of NSF, CSI, and DIS. The DIS frame contains a flag sequence (F) indicating a start and a completion of the frame; an address field (A), a control field (C), a facsimile control field (FCF), a facsimile information field (FIF), and a frame check sequence (FCS).

It is to be noted herein that a preamble, which is shown in FIG. 9 and constituted by flag patterns is added inevitably to a head of each control signal for about one second. For instance, a delivery time of CFR frame is about 0.2 second, and about one second of preamble is added thereto. In a series of facsimile transmission control procedure sequence, a time expended for these preamble transmissions is about six seconds in, for example, a sequence shown in FIG. 8, because six preambles are added to eight procedure signals (see FIG. 9). A reduction of such expended time is also a problem in view of a total reduction for a time of transmission control procedure.

In the case when a procedure based on the Recommendation T.3 is employed for a facsimile transmission control procedure for relay purpose through a public telephone network in such event where a facsimile communication is relayed between mobile communication control units each of which involves a radio link, and they are disposed at different places from one another, there is such a problem as described hereinafter. The problem is in that there is a possibility of breakdown of communication by transmission delay due to redelivery control of data in the case when data error arises on a radio link during a transmission and a response thereof in mobile communication control units each including such radio link. Such problem mentioned herein will be described.

FIG. 10 is a diagram showing such a situation that CFR transmitted by a receive terminal 3 is relayed with a time delay to a transmit terminal 1 as a result of an influence of transmission delay in a phase B of a facsimile transmission control procedure (see FIG. 8), so that a starting time of a phase C deviates remarkably in the transmit terminal 1 and the receive terminal 3.

FIG. 11 is a diagram showing such a situation that a time condition defined by the Recommendation T.30 comes to be not satisfied finally in a phase D of the transmit terminal 1 because of the deviation of starting time of the phase C in the transmit terminal 1 and the receive terminal 3 shown in FIG. 10. FIG. 12 is a diagram for explaining a problem involved in a time length of procedure signal defined by the Recommendation T.30.

As shown in FIG. 10, there may be such a case where a first time redelivery of NSS, TSI, DCS, and TCF has been executed because of an elapse of time for a period of T4 (three seconds) after transmission of TCF in a mobile communication control unit 8 at such a time that the NSS, TSI, and DCS, which are transmitted from a transmit terminal 1, reach a receive terminal 3 with a delay time involved, and CFR is transmitted after receiving these signals by the receive terminal 3. In this case, a mobile communication control unit 9 is in a state of reception for these signals from the mobile communication control unit 8, so that the mobile communication control unit 9 cannot transmit the CFR received from the receive terminal 3 to the mobile communication control unit 8. The mobile communication control unit 9 transmits the CFR at the time when reception of these signals was completed from the mobile communication control unit 8, and a mobile terminal 5 intends to transmit CFR to a transmit terminal 1.

At which time, there may be a case where the transmit terminal 1 is in the process of a second time redelivery of NSS, TSI, DCS, and TCF. In this case, the mobile terminal 5 transmits CFR to the transmit terminal 1 after receiving the second time redelivery of these signals from the transmit terminal 1. The transmit terminal 1 transmits an image signal after receiving the CFR. At this occasion, there may be a case where the mobile communication control unit 8 is in making the second time redelivery of NSS, TSI, DCS, and TCF with respect to the mobile communication control unit 9. This is because a communication is stopped in the mobile communication control unit 9 in the case when no image signal is received thereby within a period of time T2 after transmitting CFR. In order to avoid such stop of communication, these signals are to be redelivered.

In case of an example of FIG. 10, NSS, TSI, DCS, and TCF are redelivered from the mobile communication control unit 8 in the case where a preparation for transmitting an image signal is not completed within four seconds after receiving CFR from the mobile communication control unit 9. Accordingly, although the mobile communication control unit 8 has received an image signal from the mobile terminal 5 at this occasion, the mobile communication control unit 8 is also in making the second redelivery of these signals, so that the image signal is transmitted to the mobile communication control unit 9 after completing the redelivery.

When a preparation for delivering an image signal is not completed within four seconds after receiving CFR from the receive terminal 3 in also a mobile terminal 7, NSS, TSI, DCS, and TCF are redelivered to the receive terminal 3. Accordingly, there may be such a case where the second delivery of these signals is made at the time when the image signal is received from the mobile communication control unit 9. In this case also, the mobile terminal 7 starts to transmit the image signal to the receive terminal 3 after completing the redelivery of these signals.

As described above, there is such a possibility that a remarkable time deviation arises at a starting time of a phase C in the transmit terminal 1 and the receive terminal 3. How much degree of time delay arises is dependent upon a degree of delay due to a processing time at each node on a transmission path, or that of a delay due to redelivery control derived from data error on a radio link. However, it has been confirmed that it is about four seconds from a transmission of an image signal by the transmit terminal 1 until the mobile communication control-unit 8 starts to transmit the image signal, and it is about eight seconds until the receive terminal 3 starts to receive the image signal in accordance with a situation of actual measurement (without accompanying any appearance of data error on a radio link).

In the following, a situation wherein a time for transmission control procedure in a phase D is affected by a deviation of starting time of a phase C will be described by referring to FIG. 11. When transmission of an image signal is completed, the transmit terminal 1 transmits EOP, while the mobile communication control unit 8 is yet in the process of transmitting the image signal because of a delay in starting the phase C described relating to FIG. 10. After a lapse of a certain period of time corresponding to that of the delay in starting the phase C, the mobile communication control unit 8 completes transmission of the image signal, and transmits EOP.

The receive terminal 3 transmits MCF after receiving the image signal and EOP following thereto. When the MCF is received by the mobile communication control unit 8, it transmits the signal to a side of the transmit terminal 1. At this occasion, however, there may be such a case where the transmit terminal 1 completes a second time redelivery of EOP, i.e., a third time transmission of EOP. In this case, a response of MCF is in time by only a narrow margin with respect to the third time EOP, which is transmitted from the transmit terminal 1. Under the situation as described above, when a transmission delay due to redelivery control derived from data error on a radio link is added, the MCF response is not in time with respect to the third time EOP, which is transmitted from the transmit terminal 1, so that there is a high possibility of appearing an abnormal communication.

Referring to FIG. 12, a procedure signal defined by the Recommendation T.30 involves a margin of about one second. Thus, there appears a transmission delay, because the procedure signal is received at each node on a transmission path, and the signal is relayed successively to the following section. Due to this transmission delay, since a redelivery sequence for the procedure signal is conducted, a further time delay appears, whereby the communication may be failed. Such an occasion mentioned herein will be described in conjunction with FIG. 12 wherein MPS and MCF are used as procedure signals, and an explanation will be made relating thereto.

As shown in FIG. 12, when the transmit terminal 1 transmits MPS, a mobile terminal 5 transmits the MPS after receiving the same to the mobile communication control unit 8. Since the MPS has a margin of time for about one second, when the signal is relayed by the mobile terminal 5, a delay of about one second appears. Such situation is found also in the mobile communication control units 8 and 9 as well as in the mobile terminal 7.

When this MPS is received by the receive terminal 3 with a transmission delay on a radio link, the receive terminal 3 returns MCF as a response to the reception of the MPS. In this case, however, the mobile communication control unit 8 cannot obtain the response within a period of time T4 after transmitting MPS to the mobile communication control unit 9. Accordingly, there may be a case where the mobile communication control unit 8 redelivers MPS. For this reason, the mobile communication control unit 9 cannot transmit MCF in spite of the fact that the MCF has been received from a side of the receive terminal 3, so that the mobile communication control unit 9 transmits the MCF after completing reception of MPS. The mobile communication control unit 8 receives MCF after completing a redelivery of the MPS, and transmits the MCF to the mobile terminal 5. At this occasion, there may be such a case that the transmit terminal 1 is in the process of a second time redelivery of MPS, i.e., a third time transmission thereof. Under the circumstances, the mobile terminal 5 returns MCF that is a response to the third time transmission of MPS.

Under the situation as described above, when a transmission delay due to redelivery control derived from data error on a radio link is added, the MCF response is not in time with respect to the third time MPS, which is transmitted from the transmit terminal 1, so that there is a high possibility of appearing an abnormal communication.

SUMMARY OF THE INVENTION

Accordingly, the present invention has been made in view of the problems involved in the prior art as mentioned above.

An object of the present invention is to provide a novel control procedure concerned with a facsimile transmission control procedure for a relay use via a public telephone network to relay facsimile communication between mobile communication control units placed at different places from one another wherein such facsimile communication is implemented by the use of a radio link.

According to the control procedure of the present invention, such a disadvantage that communication is breakdown due to a transmission delay derived from redelivery control in the case where a data error arose on a radio link during transmission and the response thereto in a mobile communication control unit including the radio link wherein a procedure based on the Recommendation T.30 is employed can be eliminated.

Furthermore, according to the above-described control procedure, a time required for such control procedure can be reduced.

In order to achieve the above-described object, a facsimile communication method being a non-standard facsimile communication method, which is based on ITU-T Recommendation T-30 and executed by the use of a non-standard facilities signal NSF (hereinafter referred simply to as "NSF") and a non-standard facilities set-up signal NSS (hereinafter referred simply to as "NSS"), comprises the steps of adding independent transmission procedure capability information to the NSF and the NSS; transmitting the NSS including the independent transmission procedure capability information in the case when the NSF including the independent transmission procedure capability information is detected by a transmission side; and implementing an independent transmission procedure between both transmission and reception sides after detecting the NSS by the reception side.

The facsimile communication method is characterized by that in the above-described independent transmission procedure, a time for delivering preamble signals added to all the binary codes to be used in a facsimile communication procedure is reduced to a predetermined time, which is shorter than that defined by the Recommendation, on and after the NSF including the independent transmission procedure capability information transmitted from the reception side was correctly discriminated by the transmission side as well as on and after the NSS including the independent transmission procedure capability information transmitted from the transmission side was correctly discriminated by the reception side.

Furthermore, the facsimile communication method is characterized by that in the above-described independent transmission procedure, after the NFS including the independent transmission procedure capability information, a called subscriber identification signal CSI (hereinafter referred simply to as "CSI"), and a digital identification signal DIS (hereinafter referred simply to as "DIS") transmitted from the reception side were correctly discriminated by the transmission side as well as after the NSS including the independent transmission procedure capability information, a transmitting subscriber identification signal TSI (hereinafter referred simply to as "TSI"), a digital command signal DCS (hereinafter referred simply to as "DCS"), and a training check signal TCF (hereinafter referred simply to as "TCF"), which are returned from the transmission side to the reception side with respect to the signals transmitted from the reception side were correctly discriminated by the reception side, the reception side transmits repeatedly a first independent signal with a predetermined first redelivery interval for a purpose to notify the transmission side to the effect that the signals were correctly detected by the reception side, that a confirmation to receive signal CFR (hereinafter referred simply to as "CFR") is in the process for preparing transmission, and that communication between the transmission side and the reception side is in ongoing; when the preparation for transmission of the CFR is completed, either the reception side transmits the CFR after transmission was completed if the first independent signal is in the process of the transmission, or the reception side transmits immediately the CFR if the first independent signal is not in the process of the transmission; and the reception side transmits a disconnect signal DCN (hereinafter referred simply to as "DCN") in the case where the preparation for transmission of the CFR is not completed within a predetermined first waiting time.

Moreover, the facsimile communication method is characterized by that the first redelivery interval of the first independent signal is sufficiently shorter than a redelivery interval of a binary code signal in a standard facsimile transmission procedure.

Still further, the facsimile communication method is characterized by that in the above-described independent transmission procedure, the transmission side waits for the CFR signal after transmitting the TCF from the transmission side, but if no signal is received within a predetermined second waiting time after transmitting the TCF, the transmission side redelivers the NSS, the TSI, the DCS, and the TCF; the number of times for redelivery of the NSS, the TSI, the DCS, and the TCF is fixed up to two; if no signal is received within the second waiting time after second time redelivery of the NSS, the TSI, the DCS, and the TCF, in other words, after a third time transmission of the NSS, the TSI, the DCS, and the TCF, the transmission side transmits the DCN; when the first independent signal was received within the second waiting time after transmitting the TCF, the transmission side waits further for the CFR or the first independent signal during the second waiting time; if no signal is received within the second waiting time after receiving the first independent signal, the transmission side transmits the DCN; when the CFR was received either within the second waiting time after transmitting the TCF, or within the second waiting time after receiving the first independent signal, the transmission side transmits repeatedly a second independent signal with a predetermined second redelivery interval for a purpose to notify the reception side to the effect that the CFR was correctly detected, that image data is in the process of preparing transmission, and that communication between the transmission side and the reception side is in ongoing; when the preparation for transmission of the image data is completed, either the transmission side transmits the image data after completing transmission of the second independent signal if it is in the course of the transmission, or the transmission side transmits immediately the image data if the second independent signal is not in the course of the transmission; and when the preparation for transmission of the image data was not completed within the predetermined first waiting time after receiving the CFR, the transmission side transmits the DCN.

Yet further, the facsimile communication method characterized by that the second redelivery interval of the second independent signal is sufficiently shorter than a redelivery interval of a binary code signal in a standard facsimile transmission procedure.

Besides, the facsimile communication method is characterized by that in the above-described independent transmission procedure, the reception side waits for the image data after transmitting the CFR from the reception side, but when the second independent signal was received within a predetermined fourth waiting time after transmitting the CFR, the reception side waits further for either the image data or the second independent signal for the fourth waiting time; if no signal is received within the fourth waiting time after transmitting the CFR, the reception side redelivers the CFR after a lapse of the fourth waiting time; the number of times for redelivery of the CFR is fixed up to two; if the second independent signal or the image data is not received within the fourth waiting time after a second time redelivery of the CFR, in other words, after a third time transmission of the CFR, the reception side transmits the DCN; and when the second independent signal or the image data is not received within the fourth waiting time after receiving the second independent signal within the fourth waiting time after transmission of the CFR, the reception side transmits the DCN.

Furthermore, the facsimile communication method is characterized by that in the above-described independent transmission procedure, the transmission side transmits a post message signal after transmitting the image data; when the post message signal is received after receiving the image data, the reception side transmits repeatedly the first independent signal with the first redelivery interval for a purpose to notify the transmission side to the effect that the image data and the post message signal were correctly detected, that a message confirmation signal MCF (hereinafter referred simply to as "MCF") is in the process of preparing transmission, and that communication between the transmission side and the reception side is in ongoing; and when the preparation for transmission of the MCF is completed, the reception side transmits the MCF after completing transmission of the first independent signal in the case where it is in the process of transmission, or the reception side transmits immediately the MCF in the case where the first independent signal is not in the process of transmission.

Moreover, the facsimile communication method is characterized by that in the above-described independent transmission procedure, the transmission side waits for the MCF or the first independent signal within a second waiting time after transmitting the post message signal, but if no signal was received within the second waiting time after delivering the post message signal, said transmission side redelivers the post message signal; the number of times for redelivery of the post message signal is fixed up to two; if the MCF is not received within the second waiting time after second time redelivery of the post message signal, in other words, after third time transmission of the post message signal, the transmission side transmits the DCN; if the post message signal is a multipage signal MPS (hereinafter referred simply to as "MPS"), the transmission side waits further for the first independent signal or the MCF during the second waiting time in the case when the first independent signal was received within the second waiting time after transmitting the MPS; the transmission side transmits the DCN in the case where no signal is received within the second waiting time after receiving the first independent signal; if the post message signal is an end of procedure signal EOP (hereinafter referred simply to as "EOP") or an end of message signal EOM (hereinafter referred simply to as "EOM"), the transmission side waits further for the first independent signal or the MCF during the fourth waiting time in the case when the first independent signal was received within the second waiting time after transmitting the EOP or the EOM; and when no signal is received within the fourth waiting time after receiving the first independent signal, the transmission side transmits the DCN.

Further, the facsimile communication method is characterized by that in the above-described independent transmission procedure, if the post message signal is the EOP, a phase D procedure based on the Recommendation is conducted on and after the MCF was transmitted from the reception side, and the MCF thus transmitted was received by the transmission side; more specifically, the reception side waits for the DCN within the second waiting time after transmitting the MCF, and when the EOP was received again during waiting for the DCN, the reception side redelivers the MCF, while the transmission side transmits the DCN after receiving the MCF.

Still further, the facsimile communication method is characterized by that in the above-described independent transmission procedure, if the post message signal is the MPS, the transmission side transmits repeatedly the second independent signal with the second redelivery interval for a purpose to notify the reception side to the effect that MCF was correctly detected by the transmission side after receiving the MCF, that image data is in the process of preparing transmission, and that communication between the transmission side and the reception side is in ongoing; when the preparation for transmission of the image data is completed, the transmission side transmits the image data after completing transmission of the second independent signal in the case where it is in the process of transmission, or the transmission side transmits immediately the image data in the case where it is not in the process of transmission; and if the preparation for transmission of the image data was not completed within the first waiting time after receiving the MCF, the transmission side transmits the DCN.

Yet further, the facsimile communication method is characterized by that in the above-described independent transmission procedure, if the post message signal is the MPS, the reception side waits for the image data after transmitting the MCF, but when the second independent signal was received within the fourth waiting time after transmitting the MCF, the reception side waits further for the image data or the second independent signal during the fourth waiting time; if the second independent signal or the image data is not received within the fourth waiting time after transmitting the MCF, the reception side redelivers the MCF again; the number of times for redelivery of the MCF is fixed up to two; if the second independent signal or the image data is not received within the fourth waiting time after a second time redelivery of the MCF, in other words, after a third time transmission of the MCF, the reception side transmits the DCN; and if the second independent signal or the image data is not received within the fourth waiting time after receiving the second independent signal within the fourth waiting time after the MCF was transmitted, the reception side transmits the DCN.

Besides, the facsimile communication method is characterized by that in the above-described independent transmission procedure, if the post message signal is the EOM, the reception side prepares for transmission of the NSF, the CSI, and the DIS after transmitting the MCF to transmit these signals after completing the preparation; when the EOM is received again within a predetermined third waiting time after transmitting the MCF before transmission of the NSF, the CSI, and the DIS, the reception side transmits again the MCF; if a preparation for transmission of the NSF, the CSI, and the DIS is not completed within the predetermined third waiting time after transmitting the MCF, the reception side transmits the DCN; the transmission side waits for the NSF, the CSI, and the DIS during the first waiting time after receiving the MCF; and if these signals are not received within the first waiting time, the transmission side transmits the DCN.

In the following, operations of the present invention will be described.

With respect to a facsimile transmission control procedure for relay use in case of relaying facsimile communication through a public telephone network between mobile communication systems disposed at different places from one another, other communication parties are discriminated by the use of respective signals of NSF and NSS defined by the Recommendation T.30. As a result, when a transmission control procedure according to the present invention can be applied in another communication party, communication is conducted in accordance with the independent transmission control procedure of the present invention, while when it cannot be applied, communication based on the standard T.30 is made.

According to the independent transmission control procedure of the present invention, a time margin of each preamble to be added to each of all the binary code signals used in the communication is reduced to a predetermined period of time on and after exchanges of NSF and NSS were effected between transmission and reception sides.

In the independent transmission control procedure according to the present invention, when command or the like was transmitted from a transmission side, a response side transmits fundamentally an independent signal 1 or 2 by which it is meant that the command or the like was correctly received, and that it is in the process of preparing transmission of a predetermined response signal or the like with a predetermined redelivery interval 1 or 2 until the predetermined response signal or the like can be transmitted. As a result, the transmission side does not redeliver the command or the like during receiving the independent signal 1 or 2, even if the response signal or the like is not received with respect to the command or the like after a lapse of a period of time defined by the Recommendation T.30, whereby an appearance of a delay time due to the redelivery of the command or the like is suppressed.

The independent signal 1 is transmitted from the reception side during a period until CFR is returned after receiving TCF as well as during a period until MCF is returned after receiving a post message signal such as MPS. On the other hand, the independent signal 2 is transmitted from the transmission side during a period until an image signal is transmitted after receiving CFR as well as during a period until the image signal is transmitted after reception of MCF after transmitting MPS.

Each of time margins in the independent signals 1 and 2 as well as each of the redelivery intervals 1 and 2 are sufficiently shorter than that of binary code signals in the standard transmission control procedure.

As a result of reducing each preamble to be added to each binary code signal as shown in FIG. 9, each time margin of the whole binary code signals may be reduced, whereby a delay arising during a relay of a signal at each node in a transmission path is suppressed.

According to the Recommendation T.30, when a predetermined response signal or the like is not returned with respect to transmission of a command or the like within a prescribed period of time, such command or the like is redelivered. In this occasion, there may be a case where confliction of a signal of the command or the like with a response signal or the like appears at each node in a system, when these signals are relayed through mobile communication control units. In other words, this is the case where reception of a command signal or the like redelivered from a transmission side overlaps reception of a response from a reception side at a certain node. In this case, transmission of these signals is relayed after completing reception of signals on both the sides. In the case where such command or the like is redelivered as described above, a delay due to the confliction of signals arises. In order to prevent such delay, when a side by which a command or the like is to be received receives such command or the like and detects correctly the same, the reception side transmits a first independent signal or a second independent signal with a predetermined first redelivery interval or a second redelivery interval until a response or the like is prepared and transmitted with respect to the command or the like. On the other hand, a transmission side does not redelivery such command or the like while the first independent signal or the second independent signal is received, even if a predetermined response to the command or the like is not returned within a predetermined period of time, whereby a possible delay is suppressed. In also such case as described above, although confliction of the command signal or the like with the first or the second independent signal may arise, each time margin of the first and the second independent signals is sufficiently short, so that a delay due to such confliction can be suppressed at the minimum degree.

BRIEF DESCRIPTION OF THE DRAWINGS

The present invention will be explained in more detail in conjunction with appended drawings, wherein:

FIG. 13 is a Table for explaining names of signals based on ITU-T Recommendation T.30.

DESCRIPTION OF THE PREFERRED EMBODIMENT

Figure 1:
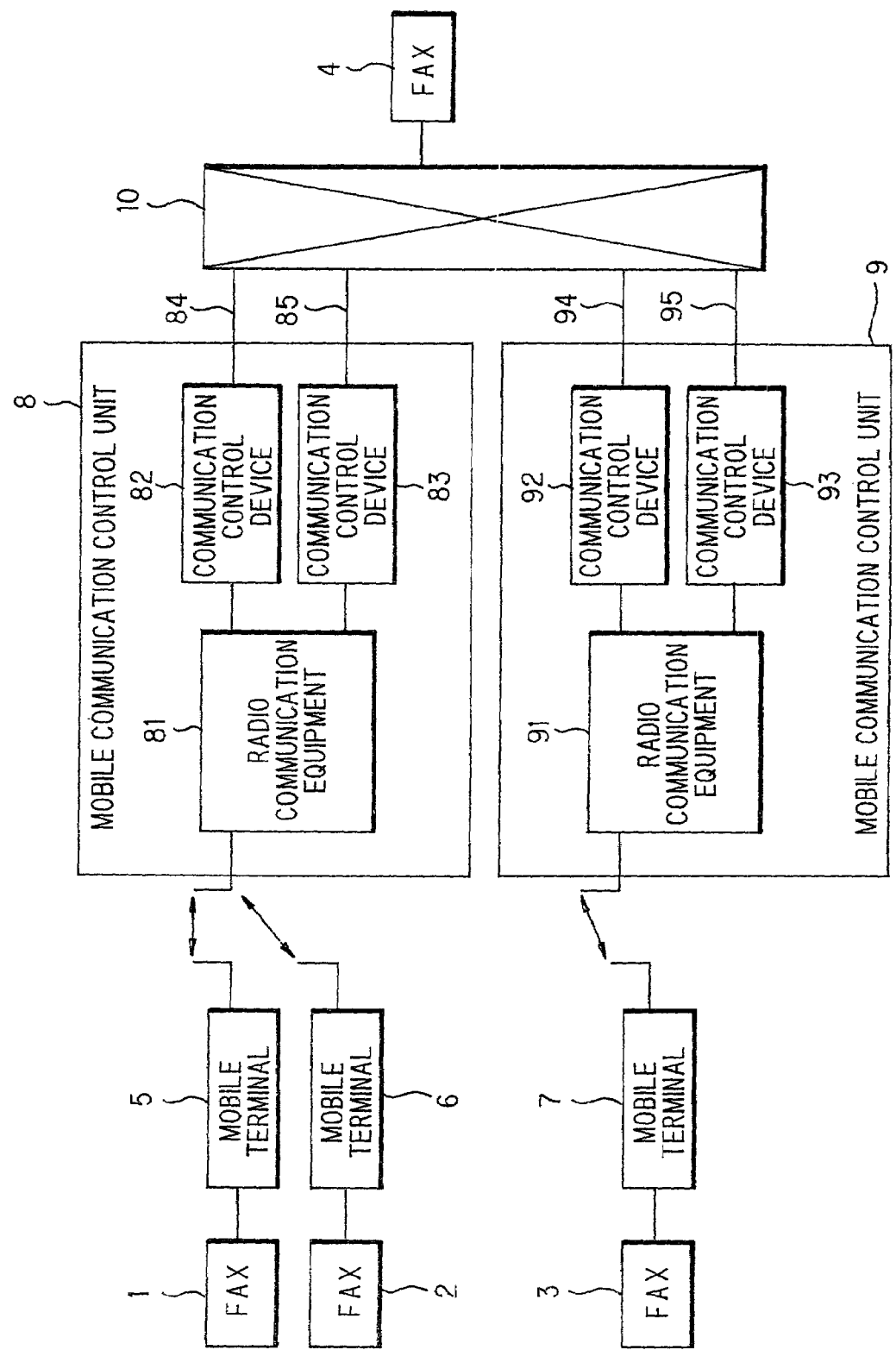
FIG. 1 is a schematic block diagram showing a facsimile communication system to which an embodiment of the present invention is applied.
Figure 2:
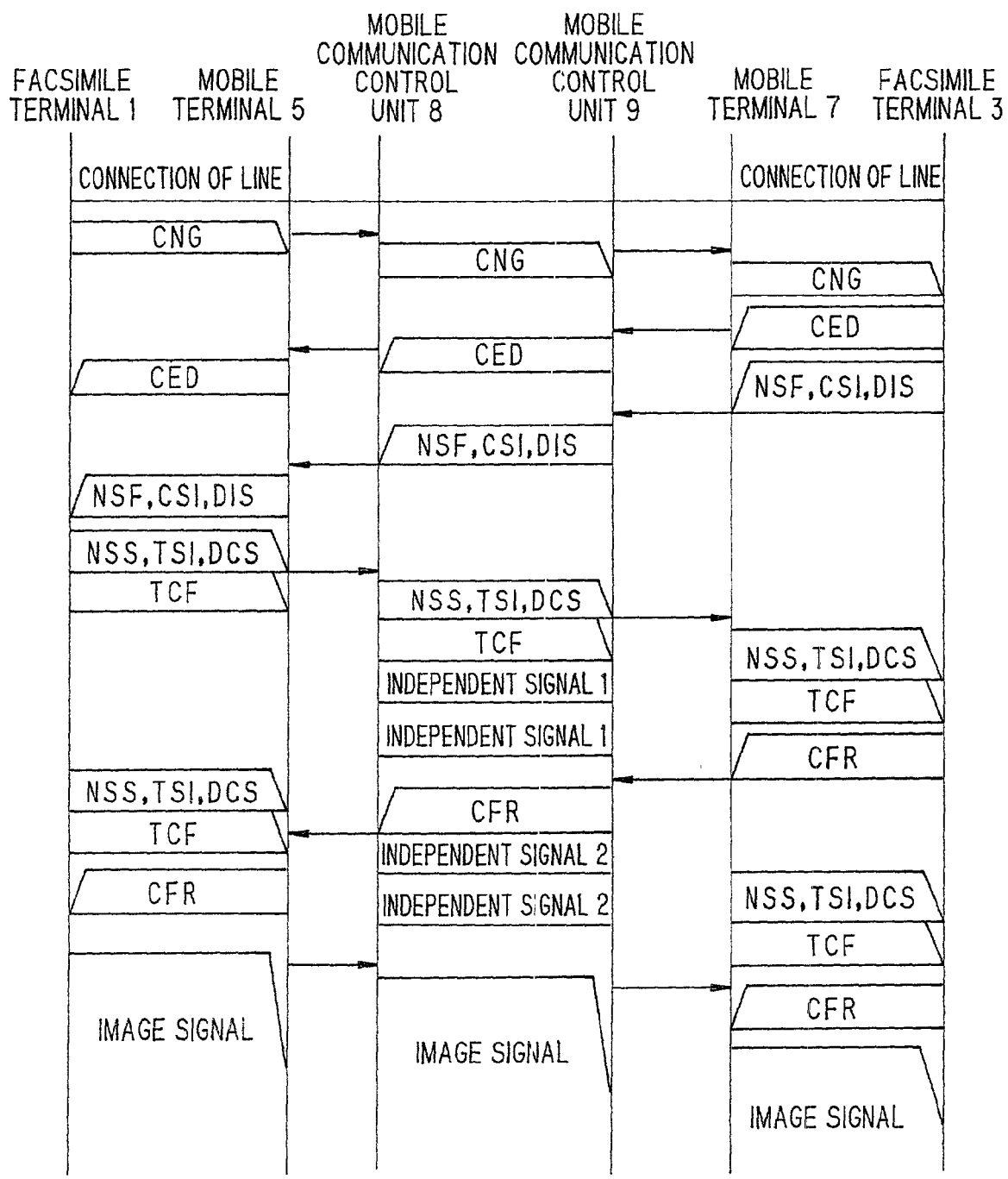
FIG. 2 is a diagram showing a communication sequence in the case where normal communication has been made in accordance with a transmission control procedure of the present invention.
Figure 3:
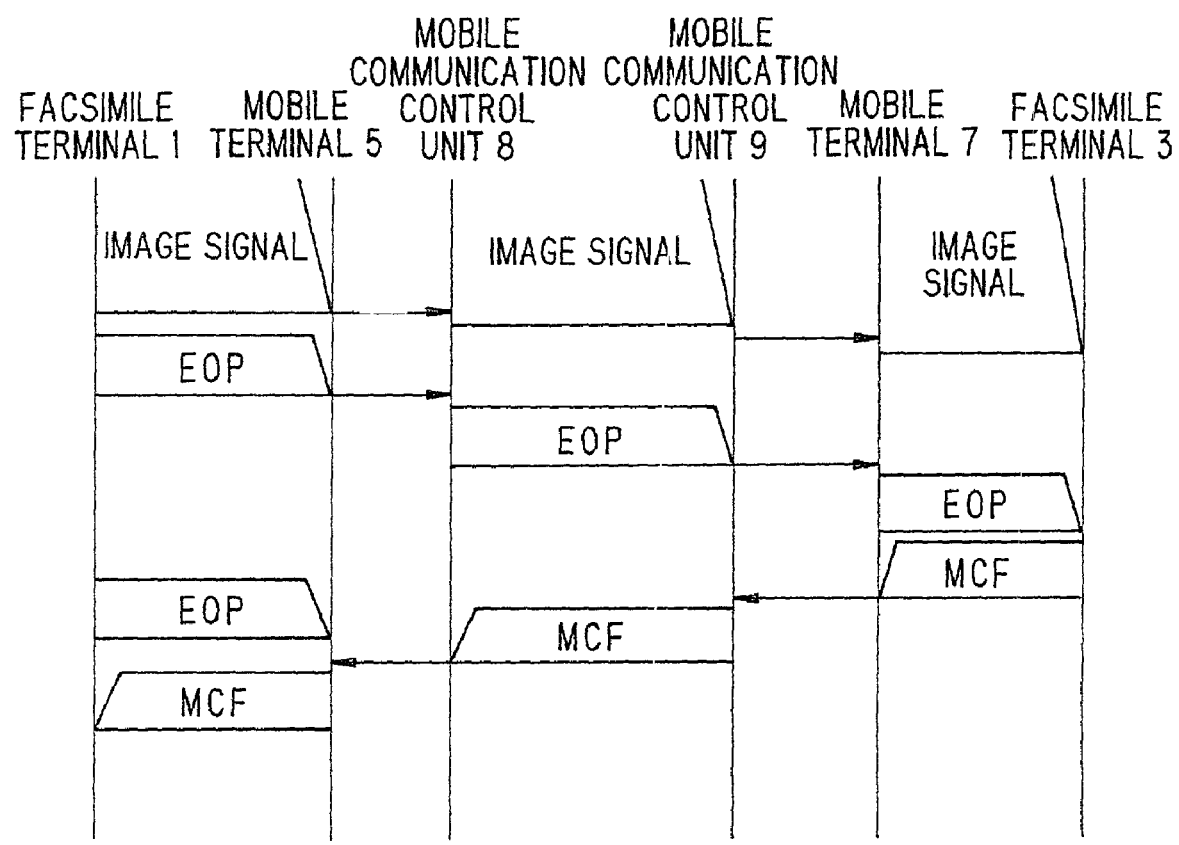
FIG. 3 is a diagram showing an example of communication sequence in the case where normal communication has been made in accordance with a transmission control procedure of the present invention.

In the following, an embodiment of the present invention will be described in detail by referring to the accompanying drawings wherein FIG. 1 is a block diagram showing in outlined constitution of a system to which an embodiment of the present invention is applied in which the whole constitution thereof has been already described, so that an explanation therefor will be omitted herein. In FIGS. 1 and 2, communication sequences each of which shows a case where a normal communication has been made in accordance with a transmission control procedure of the present invention.

After connection of a line, a receive terminal 3 transmits NSF, CSI, and DIS, and independent transmission procedure capability information is added to NSF in a mobile communication control unit 9, so that these signals are relayed to a mobile communication control unit 8. The independent transmission procedure capability information is uniquely set up in a facsimile information field FIF of NSF.

Figure 9:
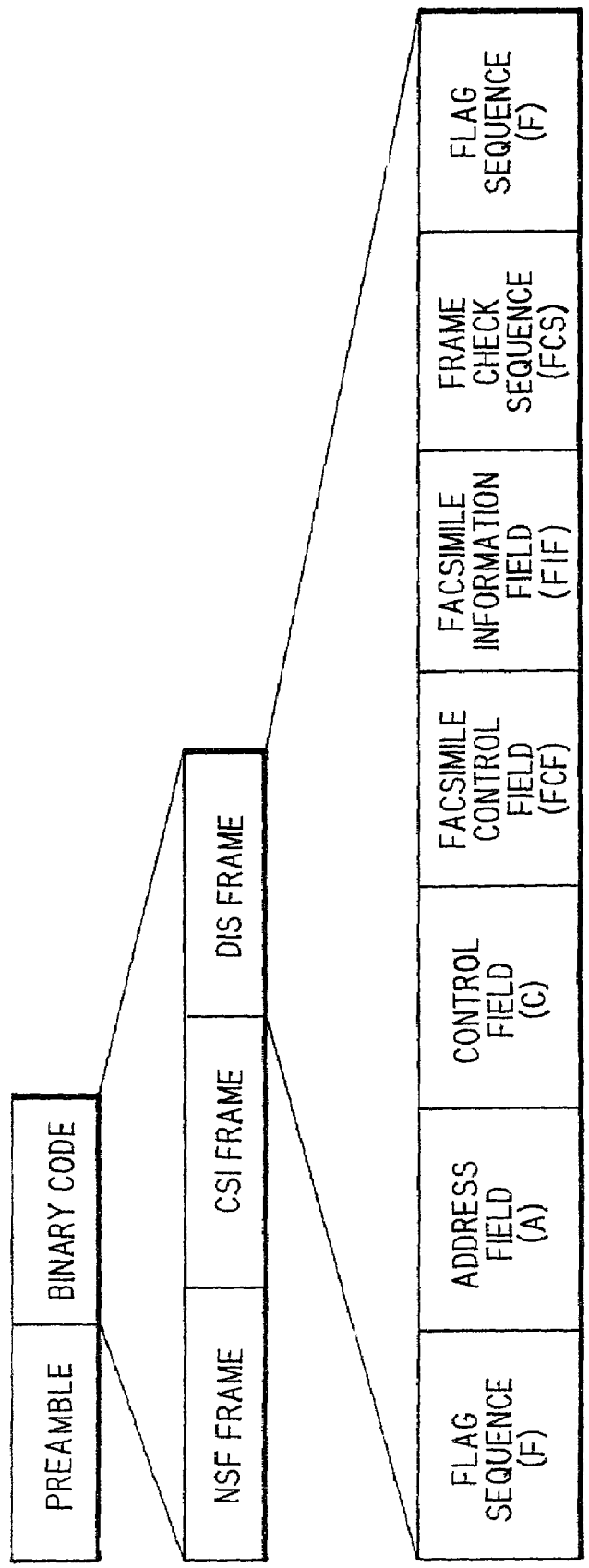
FIG. 9 is a diagram showing an example of a format for binary code signals.
Figure 10:
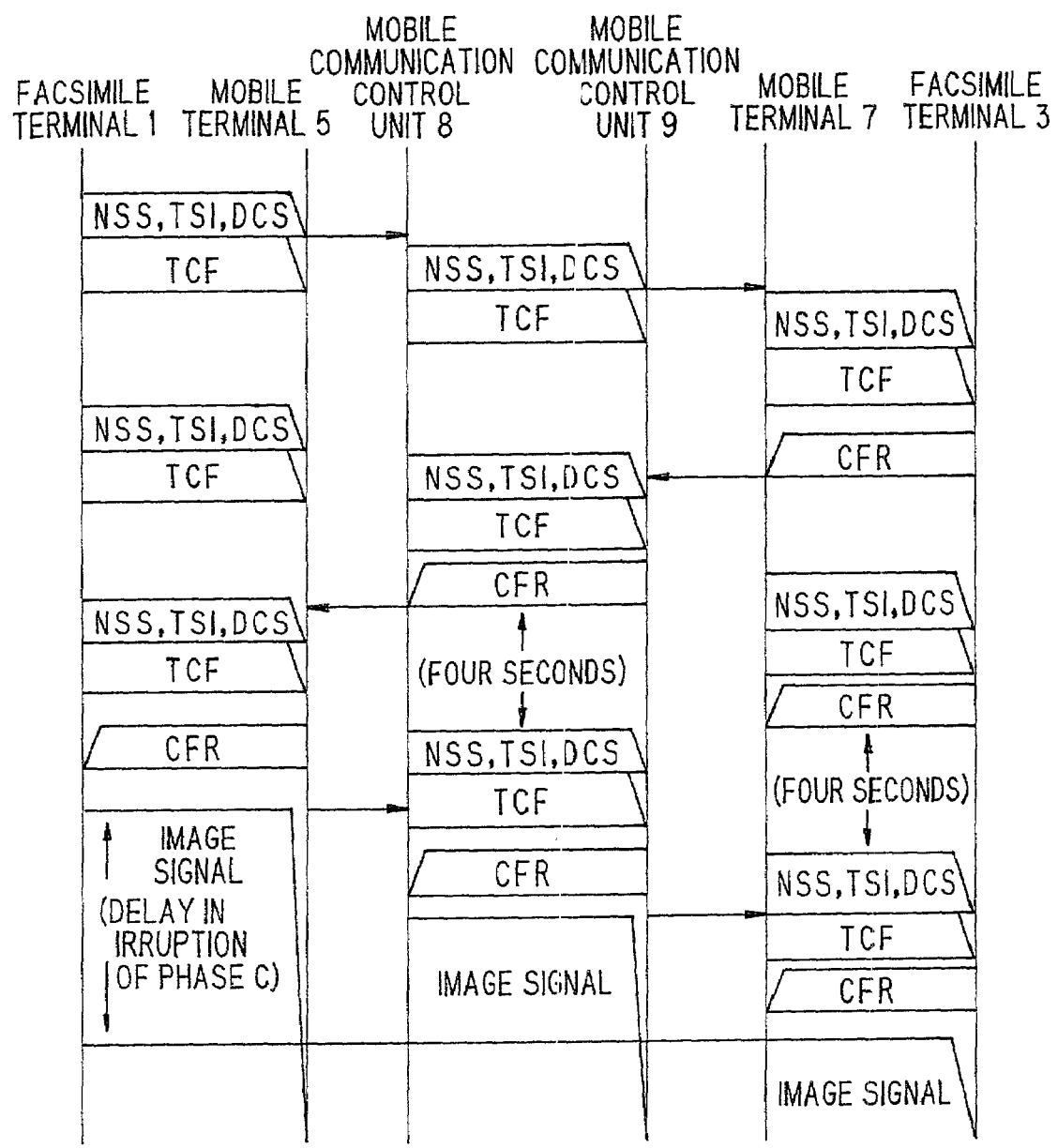
FIG. 10 is a diagram showing an example in the case where a remarkable delay arises as to a starting time of a phase C, when a procedure based on the Recommendation T.30 is used as the one for a facsimile transmission control procedure for relay use between mobile communication control units.
Figure 11:
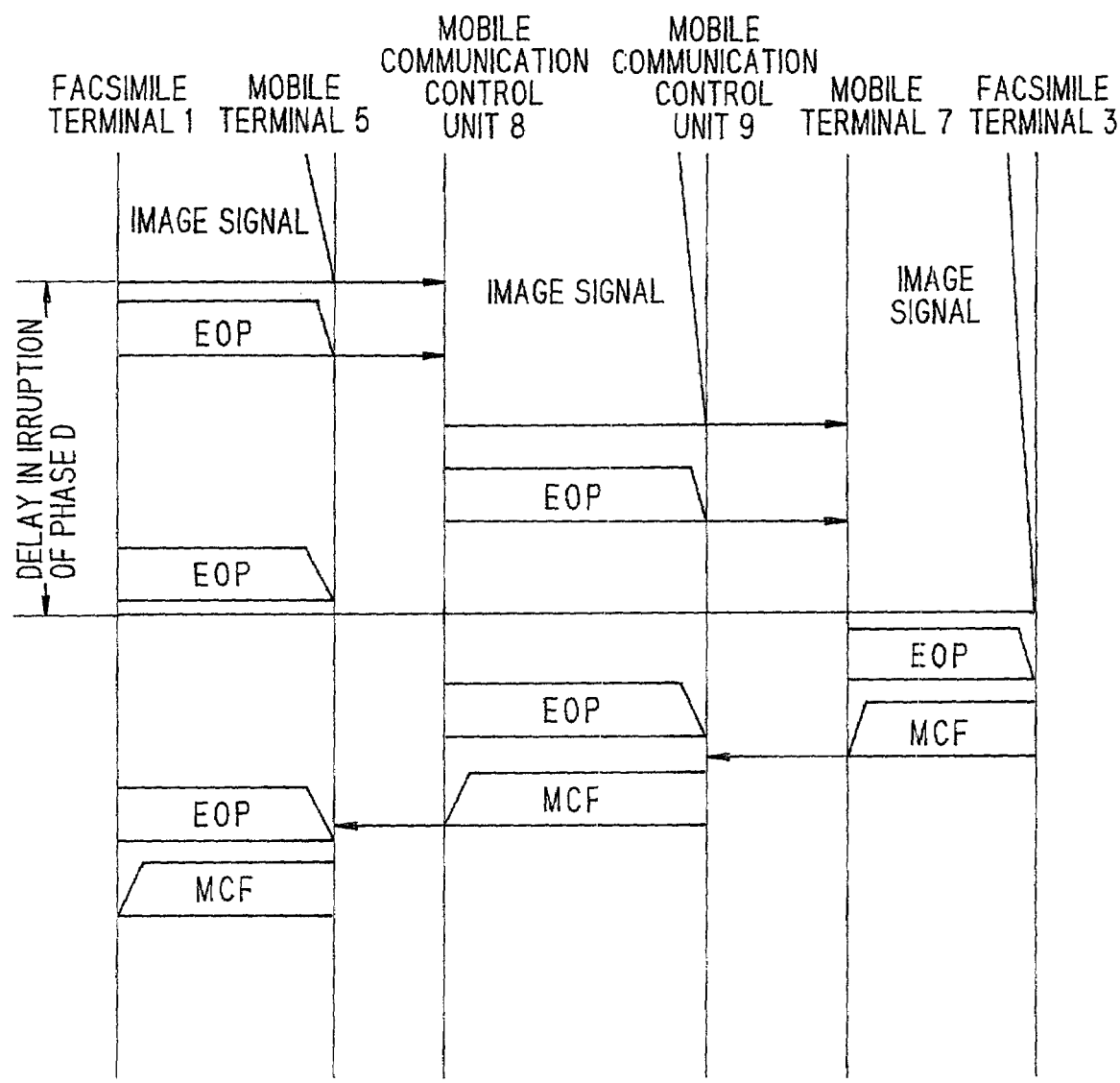
FIG. 11 is a diagram showing an example of a phase D affected by the case where a remarkable delay arises as to a starting time of a phase C, when a procedure based on the Recommendation T.30 is used as the one for a facsimile transmission control procedure for a relay use between mobile communication control units.
Figure 12:
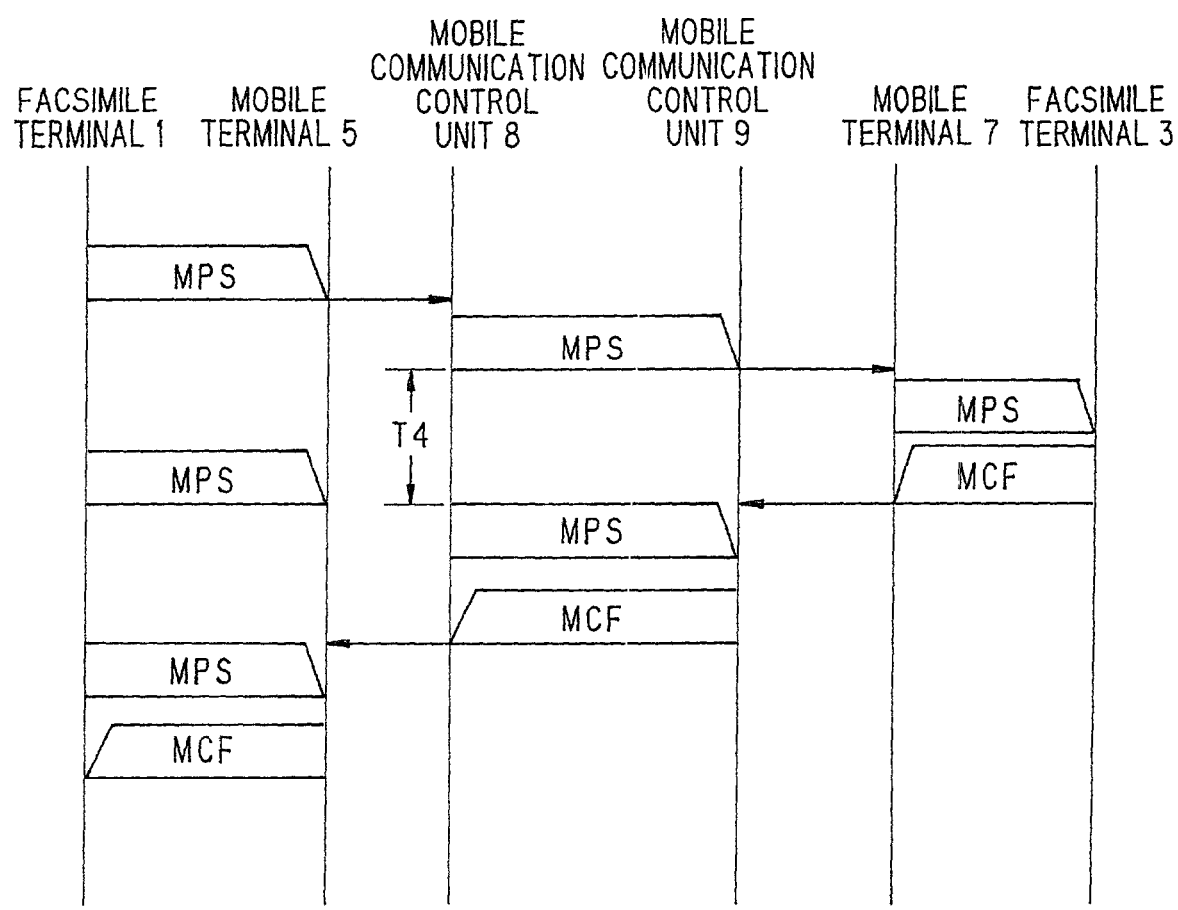
FIG. 12 is a diagram showing an example in the case where a relay delay of a procedure signal in each node on a transmission path due to an influence of a time margin for a transmission control procedure signal.

To NSF, CSI, and DIS transmitted from the mobile communication control unit 9, a preamble is added in the form shown in FIG. 9. This preamble involves a margin of time for about one second in accordance with a rule of the Recommendation T.30. This is because a case where the mobile communication control unit 8 does not support a transmission control procedure according to the present invention is taken into consideration. If the procedure of the present invention is not supported, there is a possibility of arising an abnormal communication in the case where such preamble is shortened.

The mobile communication control unit 8 receives these signals to detect an independent transmission procedure capability in NSF, and recognizes that the opposed mobile communication control unit 9 has the independent transmission procedure capability of the present invention. The mobile communication control unit 8 transmits the NSF to a side of the transmit terminal 1 after deleting information of the independent transmission procedure capability contained in the NSF.

After receiving these signals, the transmit terminal 1 transmits NSS, TSI, DCS, and TCF. The TCF is not relayed between the mobile terminal 5 and the mobile communication control unit 8. When the NSS, the TSI, and the DCS are received by the mobile communication control unit 8, it functions to add independent transmission procedure capability information to the NSS, further to shorten a preamble to be added at the forefront of a signal sequence of the NSS, the TSI, and the DCS to transmits the resulting signal sequence, and to produce TCF thereby transmitting the same. Such independent transmission procedure capability information is uniquely set up in a facsimile information field FIF of NSS.

A time length of a preamble to be shortened is adjustable in the present embodiment, so that a time length has been previously fixed to a value specified by an operator for a system, for example, a time length of 300 ms is set up in the mobile communication control unit 8.

The mobile communication control unit 9 receives these signals to detect independent transmission procedure capability information in NSS, and recognizes that the opposed mobile communication control unit 8 has an independent transmission procedure capability.

The mobile communication control unit 9 transmits these signals to a side of the receive terminal 3 after deleting the independent transmission capability information contained in the NSS. TCF is not relayed between the mobile communication control unit 9 and the mobile terminal 7. From now on, an independent transmission control procedure of the present invention is executed between the mobile communication control units 8 and 9, besides preambles for all the binary codes, which are to be used in the communication, are shortened.

The mobile terminal 7 relays NSS, TSI, and DCS with respect to the receive terminal 3, and further produces TCF to transmit the same to the receive terminal 3. When the receive terminal 3 receives these signals, it returns CFR.

After receiving the TCF from the mobile communication control unit 8, the mobile communication control unit 9 transmits an independent signal 1 to the mobile communication control unit 8 in a redelivery cycle 1, which has been previously determined, until the CFR is received from the side of receive terminal 3.

In the present embodiment, a receive not ready signal RNR is used as the independent signal 1 among binary code signals defined by the Recommendation T.30, and the redelivery cycle 1 is fixed to 200 ms. Although the RNR is not adapted to a manner for application of the RNR signal defined by the Recommendation T.30, a function of the above-described independent signal 1 is given to the RNR signal in the present embodiment. Namely, the function of the RNR signal in the present embodiment is such that TCF is received by the mobile communication control unit 9, and it indicates to be in the process of preparing CFR transmission as well as to be in the process of continuing communication between the mobile communication control units 8 and 9. Furthermore, it is recognized in the present communication from independent transmission procedure capability information, which has been added to NSF and NSS, that an independent transmission control procedure (an independent procedure, which has not been based on the TUT-T Recommendation) of the present invention is used in both the mobile communication control units. Accordingly, there is no discrepancy in view of a procedure control.

In the independent signal 1, a fundamental format defined by the Recommendation T.30 is employed, and the format is arbitrary as to what kind of signal is defined so far as a time length is not necessarily lengthy.

When the mobile communication control unit 9 receives CFR, it stops transmission of the independent signal 1 and transmits the CFR to the mobile communication control unit 8. When the CFR is received by the mobile communication control unit 8, it transmits the same to a side of transmit terminal 1. Although the mobile terminal 5 tries to transmit CFR to the transmission terminal 1, at this occasion, there may be a case where the transmission terminal 1 conducts a first time redelivery of NSS, TSI, DCS, and TCF. In this case, the mobile terminal 5 transmits CFR to the transmit terminal 1 after receiving these signals.

When the mobile communication control unit 8 receives CFR from the mobile communication control unit 9, the mobile communication control unit 8 transmits an independent signal 2 to the mobile communication control unit 9 with a redelivery cycle 2. In the present embodiment, a command repeat signal CRP is used as the independent signal 2 among binary code signals defined by the Recommendation T.30, and the redelivery cycle is fixed to 200 ms.

Although the CRP is not adapted to a manner for application of the CRP signal defined by the Recommendation T.30, a function of the above-described independent signal 2 is given to the CRP signal herein. Namely, the function of the CRP signal in the present embodiment is such that CFR is received by the mobile communication control unit 8, and it indicates to be in the process of preparing transmission of an image signal as well as to be in the process of continuing a communication between the mobile communication control units 8 and 9. Furthermore, it is recognized in the present communication from independent transmission procedure capability information, which has been added to NSF and NSS, that an independent transmission control procedure of the present invention is used in both the mobile communication control units. Accordingly, there is no discrepancy in view of a procedure control.

In the independent signal 2, a fundamental format defined by the Recommendation T.30 is employed, and the format is arbitrary as to what kind of signal is defined so far as a time length is not necessarily lengthy.

When the transmit terminal 1 receives CFR, it starts to transmit an image signal. When the mobile communication control unit 8 receives the image signal from a side of transmission terminal 1, it stops transmission of the independent signal 2, and transmits the image signal to the mobile communication control unit 9. The mobile communication control unit 9 transmits the image signal from the mobile communication control unit 8 to the mobile terminal 7. In this occasion, since there may be a case of being in the process of a first time redelivery of NSS, CSI, DCS, and TCF from such fact that there was a situation wherein the mobile terminal 7 could not transmit the image signal even a lapse of four seconds after receiving CFR from the receive terminal 3. In such case as described above, the mobile terminal 7 starts to transmit the image signal to the receive terminal 3 after completing the transmission of these signals.

When the transmit terminal 1 completes transmission of the image signal, it transmits EOP. The mobile communication control units 8 and 9 relay the EOP to a side of receive terminal 3. When the receive terminal 3 receives the EOP, it responds with MCF, such MCF is relayed through the mobile communication control units 9 and 8, and it is transmitted to a side of transmit terminal 1. At this occasion, there may be a case of being in the process of a first time redelivery of EOP in the transmit terminal 1, so that MCF is conveyed to the transmit terminal 1 in the form of responding to the EOP.

In the following, details of a transmission control procedure between the mobile communication control unit 9 and the mobile communication control unit 8 including operations in case of abnormal communication will be described. For simplicity of the description, the mobile communication control unit 9 and the mobile communication control unit 8 are referred to simply as "reception side" and "transmission side", respectively.

Figure 4:
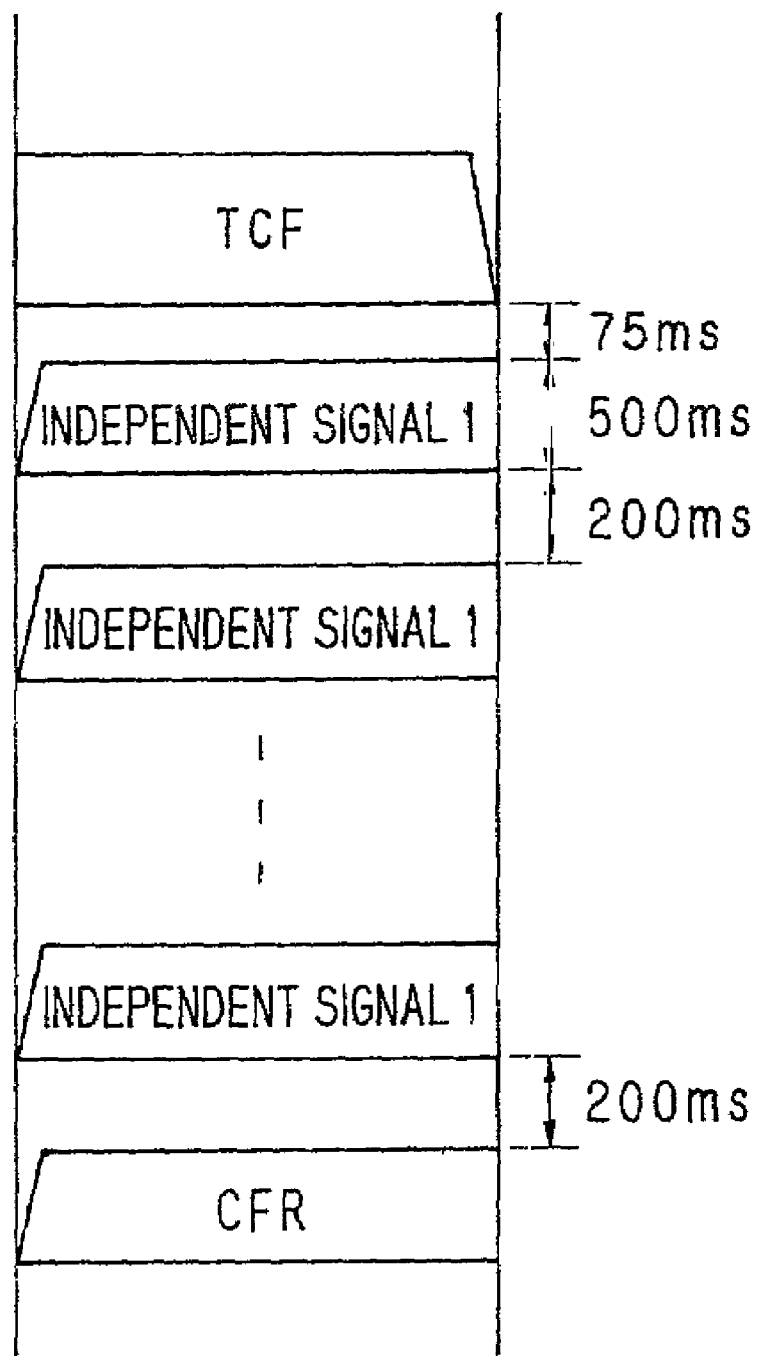
FIG. 4 is a diagram showing an example of a communication sequence in a transmission control procedure according to an embodiment of the present invention.

First, operation on the reception side will be described hereinafter. FIG. 4 is a diagram showing a situation wherein the transmission side transmits TCF to the reception side, and then, the reception side returns an independent signal 1. The reception side transmits the independent signal 1 to the transmission side after a lapse of 75 ms after having received the TCF from the transmission side. A time length of the independent signal in the present example is suppressed to about 500 ms including a preamble to be added to the independent signal 1. Furthermore, the independent signal 1 is transmitted in a redelivery interval 1, which has been previously determined, i.e., 200 ms redelivery interval in the present example. When a preparation for transmitting CFR is completed, the reception side transmits the CFR following to a preamble.

After transmitting the independent signal 1 from the reception side to the transmission side, if the preparation for transmitting CFR is not completed even after a lapse of a waiting time 1, which has been previously determined, (35 seconds in the present example) or more, DCN is transmitted to the transmission side to stop the communication.

After transmitting the CFR from the reception side to the transmission side, when an independent signal 2 is received from the transmission side within a predetermined waiting time 4 (1.5 second in the present example), the reception side waits further for transmission of an image signal or the independent signal 2 from the transmission side during the waiting time 4. When no signal is received from the transmission side during the waiting time 4, the reception side transmits DCN to the transmission side to stop the communication.

After transmitting CFR from the reception side to the transmission side, if the independent signal 2 or any image signal is not received from the transmission side during the waiting time 4, the reception side redelivers the CFR to the transmission side. This is because it was supposed to be such a situation wherein the transmission side has recognized erroneously the first CFR, which was transmitted from the reception side, as a preamble. More specifically, since the transmission side is in a state of no recognition of the CFR, it is waiting for the independent signal 1 or the CFR.

The number of times for redelivery of CFR is fixed up to two, and when neither an independent signal 2 nor an image signal is received within the waiting time 4 after a second time redelivery of such CFR, the reception side transmits DCN to the transmission side to stop the communication. After transmitting CFR from the reception side to the transmission side, when an abnormal signal (a signal involving erroneous data) was received from the transmission side within awaiting time 4, the reception side waits further for the independent signal 2 or an image signal within the waiting time 4. When no signal is received from the transmission side during the waiting time 4, the reception side transmits DCN to the transmission side to stop the communication.

Figure 5:
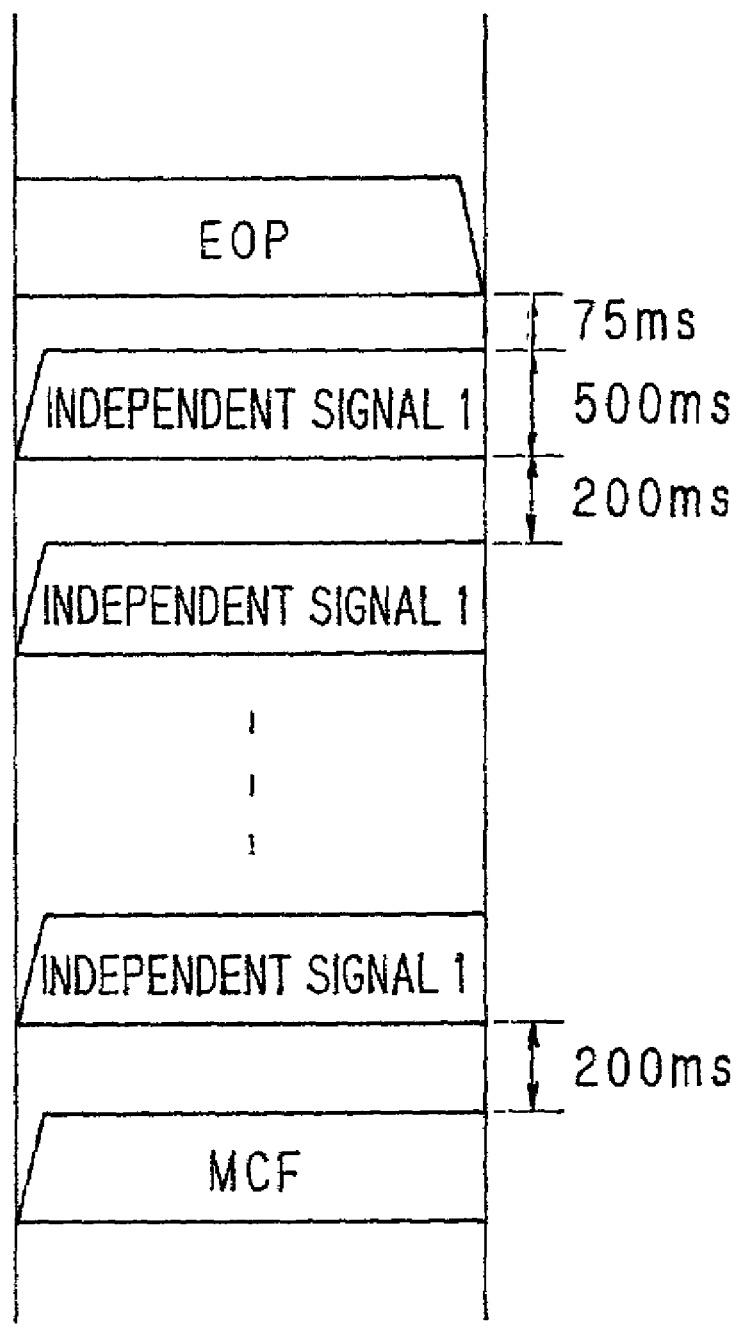
FIG. 5 is a diagram showing another example of a communication sequence in a transmission control procedure according to an embodiment of the present invention.

In the case when a post message from the transmission side was received by the reception side, if a preparation for transmission of MCF to the transmission side is not completed after a lapse of 75 ms from reception of the post message, the reception side transmits a preamble and the independent signal 1 to the transmission side with a redelivery interval 1. When the preparation for transmission of MCF is completed, the reception side transmits MCF following to the preamble to the transmission side, a situation of which being shown in FIG. 5.

The reception side waits for DCN to be transmitted from the transmission side for a waiting time 2 (three seconds in the present case) after EOP was received from the transmission side as a post message, and the reception side returned MCF to the transmission side. If the DCN is not received within the waiting time 2, the reception side disconnects the line. Or one hand, when EOP is received again within the waiting time 2, the reception side returns MCF to the transmission side.

In the case where MPS was received by the reception side as a post message from the transmission side, the reception side returned MCF to the transmission side, and then, the reception side received the independent signal 2 from the transmission side within the waiting time 4, the reception side waits further for an independent signal 2 or an image signal from the transmission side within a waiting time 4. When the reception side receives no signal from the transmission side within the waiting time 4, the reception side transmits DCN to the transmission side to stop the communication.

In the case where the reception side received MPS as a post message from the transmission side, the reception sides returned MCF to the transmission side, and then, the reception sides received neither an independent signal 2 nor an image signal from the transmission side within a waiting time 4, the reception side redelivers MCF to the transmission side. This is because it was supposed to be such a situation wherein the transmission side has recognized erroneously the first MCF, which was transmitted from the reception side, as a preamble due to data error on a line and the like. More specifically, since the transmission side is in a state of no recognition of the MCF, it is waiting for the independent signal 1 or the MCF.

The number of times for redelivery of MCF is fixed up to two, and when neither an independent signal 2 nor an image signal is received within the waiting time 4 after a second time redelivery of such MCF, the reception side transmits DCN to the transmission side to stop the communication.

In the case where the reception side received MPS as a post message from the transmission side, the reception side returned MCF to the transmission side, and then, the reception side received a signal involving data error from the transmission side within a waiting time 4, the reception side waits further for an independent signal 2 or an image signal from the transmission side during a waiting time 4. During the wailing time 4, the reception side receives no signal from the transmission side; the reception side transmits DCN to stop the communication.

The reception side waits for completing a preparation for transmission of NSF, CSI, and DIS during a waiting time 3 (six seconds in the present case) after the reception side received EOM as a post message from the transmission side, and the reception side returned MCF to the transmission side. During the waiting time 3, when the reception side received again EOM from the transmission side, the reception side returns MCF to the transmission side.

If the preparation for transmission of NSF, CSI, and DIS is completed within the waiting time 3, the reception side transmits these signals to the transmission side. When the preparation for transmission of these signals is not completed within the waiting time 3, the reception side disconnects the line to stop the communication.

This is because it was supposed to be such a situation wherein the transmission side has recognized erroneously the first CFR, which was transmitted from the reception side, as a preamble. More specifically, since the transmission side is in a state of no recognition of the CFR, it is waiting for the independent signal 1 or the CFR.

The number of times for redelivery of CFR is fixed up to two, and when neither an independent signal 2 nor an image signal is received within the waiting time 4 after a second time redelivery of such CFR, the reception side transmits DCN to the transmission side to stop the communication.

In the following, operations of a transmission side will be described hereinafter.

When the transmission side received no signal within awaiting time 2 (three seconds in the present case) from a reception side after transmitting TCF to the reception side, the transmission side redelivers NSS, TSI, DCS, and TCF to the reception side. The number of times for redelivery of these signals is fixed up to two, and when no signal is received within the waiting time 2 after a second time redelivery of such signals, the transmission side transmits DCN to the reception side to stop the communication.

After transmitting TCF to the reception side, when an independent signal 1 was received from the reception side within the waiting time 2, the transmission side waits further for CFR from the reception side during the waiting time 2. After transmitting TCF to the reception side and in the process of waiting for an independent signal 1 or CFR from the reception side, the transmission side transmits DCN to the reception side to stop the communication in the case where transmission side receives only a preamble or a signal involving data error, and then no signal is received from the reception side within a further waiting time 2. This is because it was supposed to be such a situation wherein CFR, which had been transmitted from the reception side, was recognized erroneously as a preamble or an error frame by the transmission side due to data error on a line and the like. Namely, although the reception side transmits CFR to the transmission side, and waits for an independent signal 2 or an image signal from the transmission side during a waiting time 4, the reception side redelivers CFR in the case when no signal is received from the transmission side. Under the circumstances, it was supposed to be such a situation where the CFR was not received by the transmission side due to data error and the like on a line.

Figure 6:
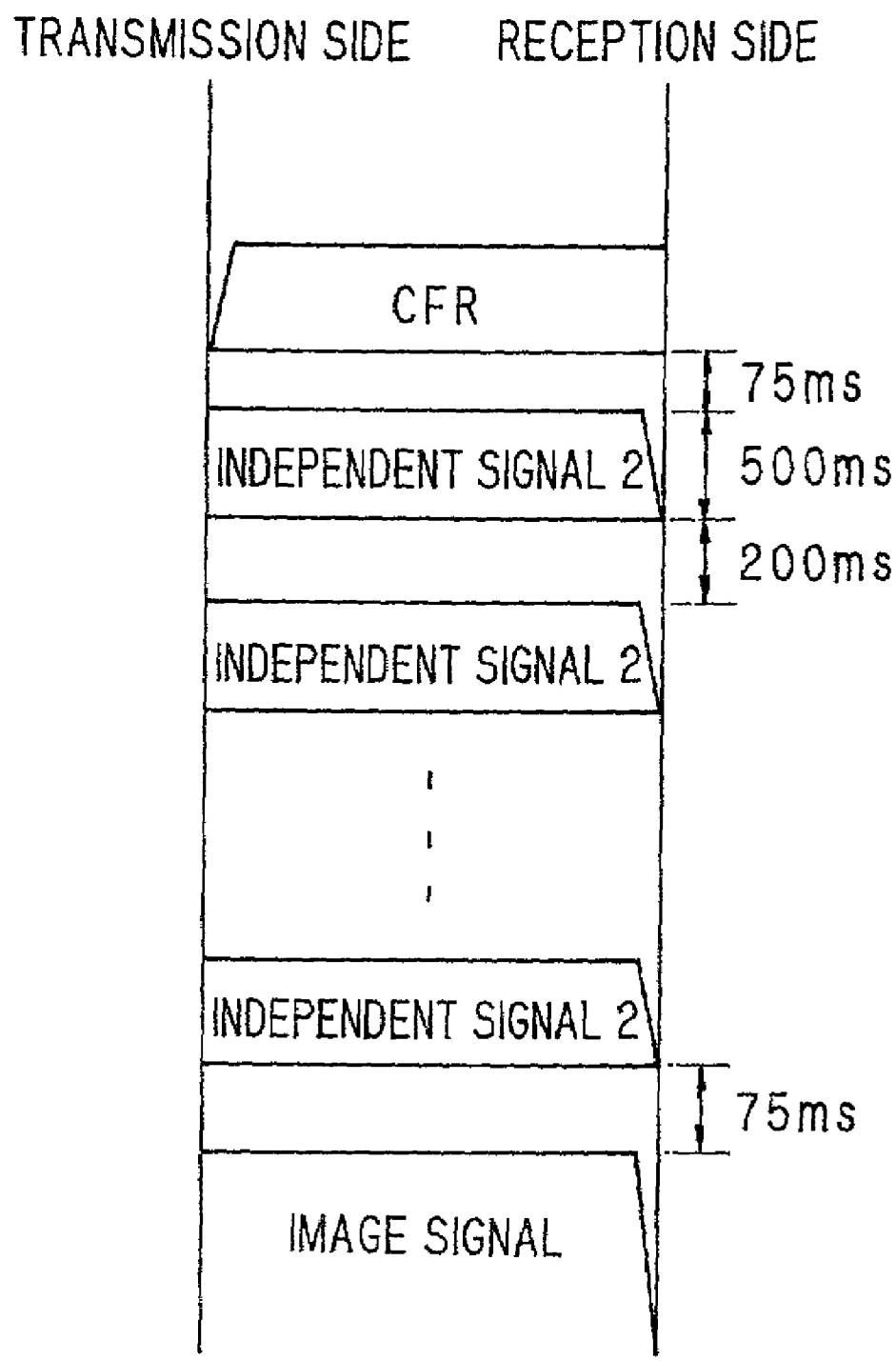
FIG. 6 is a diagram showing a further example of a communication sequence in a transmission control procedure according to an embodiment of the present invention.

After the transmission side receives the independent signal 1 from the reception side, when the transmission side receives CFR from the reception side within the waiting time 2, the transmission side transmits the independent signal 2 to he reception side after a lapse of 75 ms. A time length of the independent signal 2 is suppressed to about 500 ms including a preamble to be added to the independent signal 2 in the present case. Furthermore, the independent signal 2 is transmitted with a predetermined redelivery interval 2, i.e., that of 200 ms in the present case. When completing a preparation for transmission of an image signal, the transmission side transmits the image signal, a situation of which being shown in FIG. 6.

When a preparation for transmission of an image signal is not completed even in a lapse of a waiting time 1 after receiving CFR from the reception side by the transmission side, the transmission side transmits DCN to the reception side to stop the communication. After completing transmission of an image signal to the reception side, the transmission side transmits a post message to the reception side, and then, the transmission side waits for MCF from the reception side during a waiting time 2. When no signal is received from the reception side during the waiting time 2, the transmission side redelivers a post message signal. The number of times for redelivery of these signals is fixed up to two, and when no signal is received within the waiting time 2 after a second time redelivery of such signals, the transmission side transmits DCN to the reception side to stop the communication.

After transmitting MPS to the reception side as a post message, the transmission side waits for an independent signal 1 or MCF from the reception side during the waiting time 2. When the independent signal 1 was received from the reception side within the waiting time 2, the transmission side waits further for an independent signal 1 or MCF from the reception side during the waiting time 2. If no signal is received from the reception side during the waiting time 2, the transmission side transmits DCN to stop the communication.

This is because it was supposed to be such a situation wherein MCF, which had been transmitted from the reception side, was recognized erroneously as only a preamble by the transmission side due to data error and the like on a line. Namely, it is in a situation wherein the reception side transmits MCF to the transmission side, and waits for an independent signal 2 or an image signal from the transmission side. If the reception side receives no signal from the transmission side during such waiting time as described above, the reception side receivers MCF. This is because it was supposed to be such a situation where the MCF cannot be received by the transmission side due to data error and the like on a line.

After transmitting EOP or EOM as a post message signal from the transmission side to the reception side, when an independent signal 1 was received from the reception side within a waiting time 2, the transmission side waits further for an independent signal 1 or MCF from the reception side during a waiting time 4. If no signal is received from the reception side within the waiting time 4, the transmission side redelivers EOP or EOM to the reception side.

This is because it was supposed to be such a situation wherein MCF, which had been transmitted from the reception side, was recognized erroneously as only a preamble by the transmission side due to data error and the like on a line. Namely, it is in a situation wherein the reception side transmits MCF to the transmission side, and waits for an independent signal 2 or an image signal from the transmission side. If the reception side receives no signal from the transmission side during such waiting time as described above, the reception side redelivers MCF. This is because it was supposed to be such a situation where the MCF cannot be received by the transmission side due to data error and the like on a line.

When MCF is received from the reception side, the transmission side takes the following operations dependent upon types of post message signal transmitted from the transmission side to the reception side. If a post message is EOP, the transmission side transmits DCN to the reception side to complete the communication after receiving MCF from the reception side.

If a post message is EOM, the transmission side waits for NSF, CSI, and DIS from the reception side during a waiting time 1 after receiving MCF from the reception side. When the transmission side receives these signals, the transmission side returns to a phase B of a transmission control procedure, which has been already described, and the same operations as that described above are repeated. When these signals are not received within a waiting time 1, the transmission side transmits DCN to the reception side to stop the communication.

Figure 7:
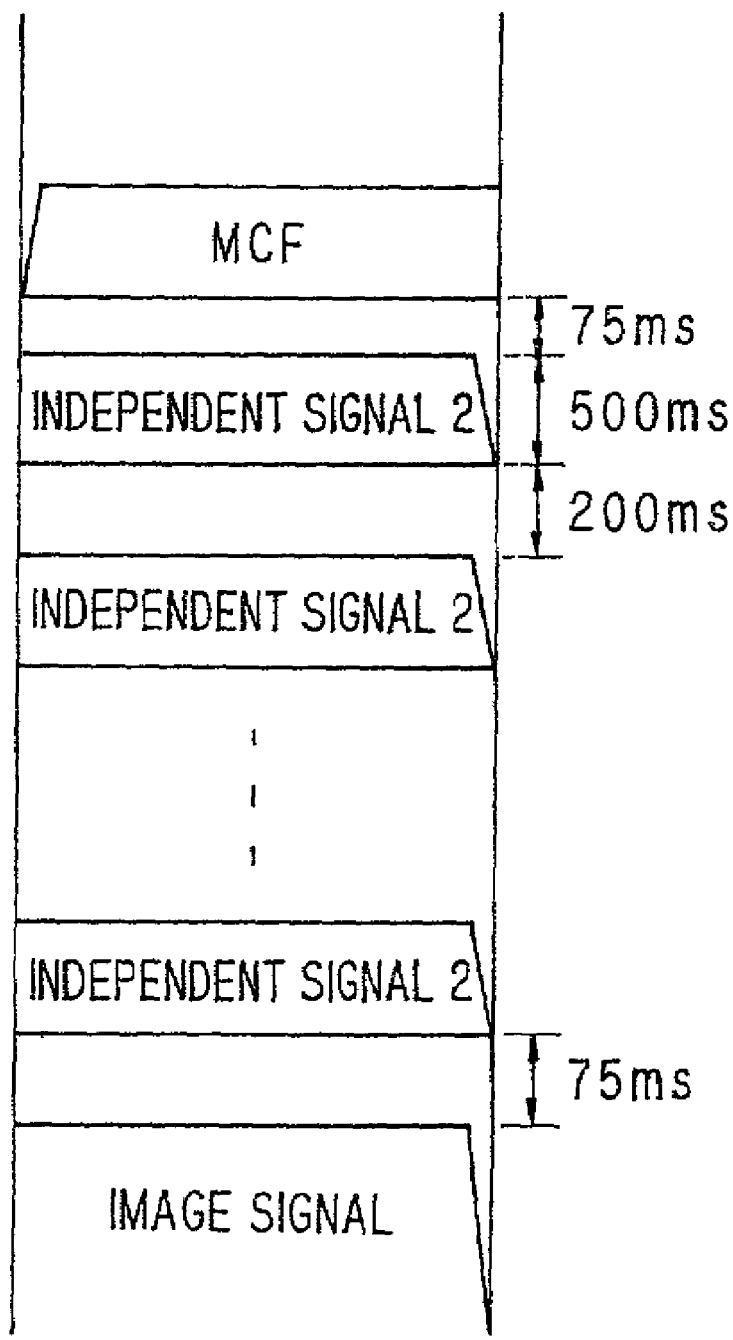
FIG. 7 is a diagram showing a still further example of a communication sequence in a transmission control procedure according to an embodiment of the present invention.
Figure 8:
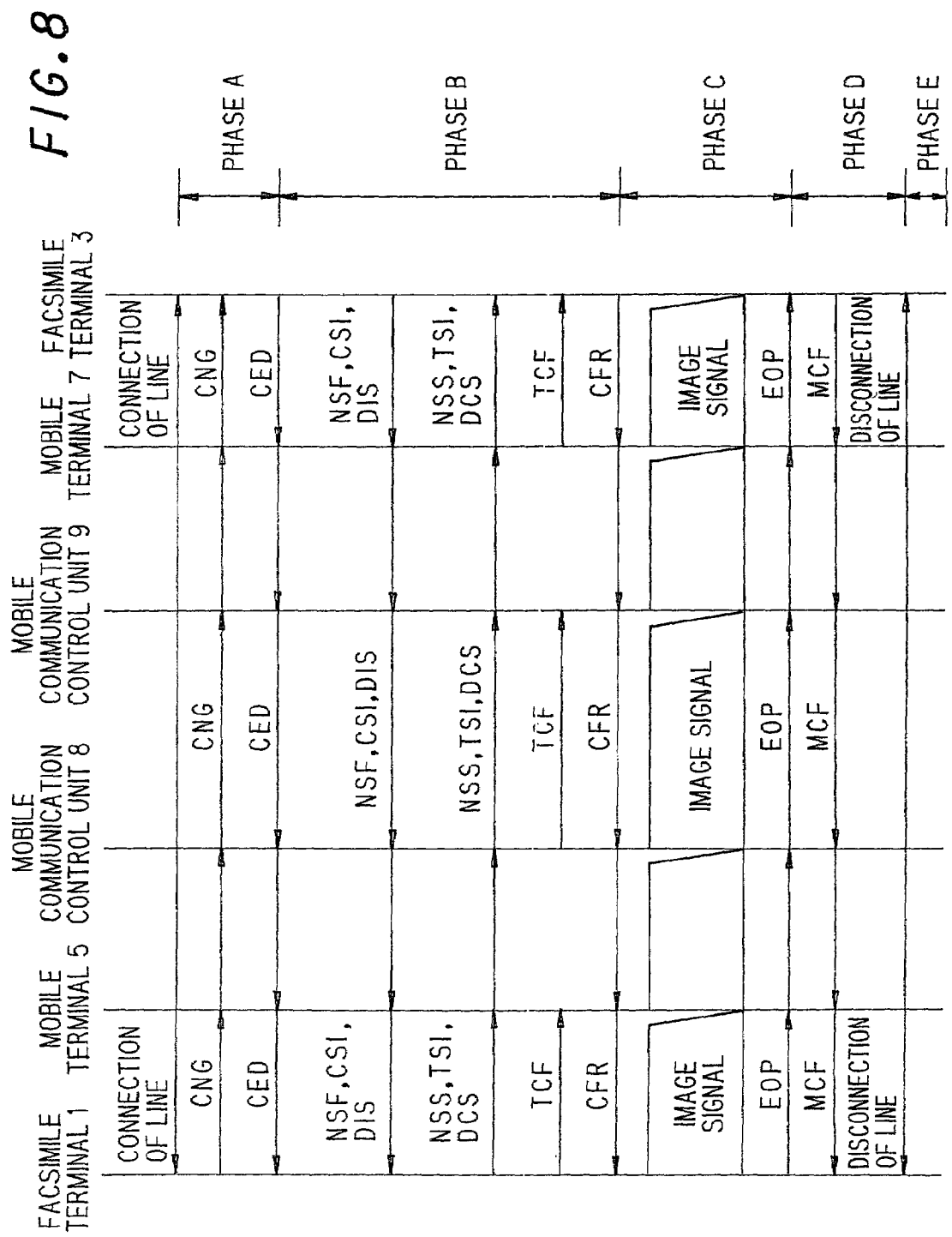
FIG. 8 is a diagram showing an example of a communication sequence illustrating a transmission control procedure based on ITU-T Recommendation T.30.

If a post message signal is MPS, after receiving MCF from the reception side, transmission side transmits an independent signal 2 to the reception side after a lapse of 75 ms. The independent signal 2 is redelivered to the reception side with a redelivery interval 2. When completing a preparation for transmission of an image signal, the transmission side transmits the image signal to the reception side, a situation of which being shown in FIG. 7.

In the case when a post message signal is MPS and a preparation for transmission of an image signal is not completed within a waiting time 1 after receiving MCF from the reception side, the transmission side transmits DCN to the reception side to stop the communication.

According to the present invention, an independent transmission control procedure of the present invention is conducted on and after both transmission and reception sides have recognized an independent transmission procedure capability signal to be added to NSF and NSS. In the transmission control procedure of the present invention, a delivery time of preambles added to all the binary codes, which are to be used in the communication, is reduced, or an independent signal 1 and an independent signal 2 are introduced into the procedure, and during reception of the independent signal 1 transmitted from the reception side, the transmission side does not redeliver a command or the like, even if a response or the like is not returned to the transmission of such command or the like. On the other hand, the reception side adopts also such an independent transmission control procedure wherein redelivery of a response or the like is not implemented during reception of an independent signal 2 transmitted from the transmission side. As a result, there is such an advantage that a transmission delay due to confliction of procedure signals arising between them in respective nodes on a transmission path, which becomes a problem in the case where a transmission control procedure based on he Recommendation T.30 is used, is suppressed, whereby it becomes possible to relay stable facsimile communication between mobile communication control units, which are placed at different places and conduct such facsimile communication with each other by the use of a radio link.

The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A facsimile communication method being a non-standard facsimile communication method, which is based on ITU-T Recommendation T-30 and executed by the use of a non-standard facilities signal NSF (hereinafter referred simply to as "NSF") and a non-standard facilities set-up signal NSS (hereinafter referred simply to as "NSS"), comprising the steps of:
   adding independent transmission procedure capability information to said NSF and said NSS;
   transmitting said NSS including said independent transmission procedure capability information in the case when said NSF including said independent transmission procedure capability information is detected by a transmission side;
   deleting said independent transmission procedure capability information after receiving said NSS; and
   implementing an independent transmission procedure between both transmission and reception sides after detecting said NSS by the reception side.

2. A facsimile communication method as claimed in claim 1 wherein:
   in said independent transmission procedure, a time for delivering preamble signals added to all the binary codes to be used in a facsimile communication procedure is reduced to a predetermined time, which is shorter than that defined by said Recommendation, on and after said NSF including said independent transmission procedure capability information transmitted from the reception side was correctly discriminated by said transmission side as well as on and after said NSS including said independent transmission procedure capability information transmitted from the transmission side was correctly discriminated by said reception side.

3. A facsimile communication method as claimed in claim 2, wherein:
   in said independent transmission procedure, after said NSF including said independent transmission procedure capability information, a called subscriber identification signal CSI (hereinafter referred simply to as "CSI"), and a digital identification signal DIS (hereinafter referred simply to as "DIS") transmitted from the reception side were correctly discriminated by the transmission side as well as after said NSS including said independent transmission procedure capability information, a transmitting subscriber identification signal TSI (hereinafter referred simply to as "TSI"), digital command signal DCS (hereinafter referred simply to as "DCS"), and a training check signal TCF (hereinafter referred simply to as "TCF"), which are returned from the transmission side to the reception side with respect to the signals transmitted from said reception side were correctly discriminated by the reception side, said reception side transmits repeatedly a first independent signal with a predetermined first redelivery interval for a purpose to notify said transmission side to the effect that said signals were correctly detected by the reception side, that a confirmation to receive signal CFR (hereinafter referred simply to as "CFR") is in the process of preparing transmission, and that communication between said transmission side and said reception side is in ongoing;
   when the preparation for transmission of said CFR is completed, either the reception side transmits said CFR after transmission was completed if said first independent signal is in the process of the transmission, or said reception side transmits immediately said CFR if said first independent signal is not in the process of the transmission; and
   said reception side transmits a disconnect signal DCN (hereinafter referred simply to as "DCN") in the case where said preparation for transmission of said CFR is not completed within a predetermined first waiting time.

4. A facsimile communication method as claimed in claim 3, wherein:
   said first redelivery interval of said first independent signal is sufficiently shorter than a redelivery interval of a binary code signal in a standard facsimile transmission procedure.

5. A facsimile communication method as claimed in claim 4, wherein:
   in said independent transmission procedure, the transmission side waits for said CFR signal after transmitting said TCF from said transmission side, but if no signal is received within a predetermined second waiting time after transmitting said TCF, said transmission side redelivers said NSS, said TSI, said DCS, and said TCF;
   the number of times for redelivery of said NSS, said TSI, said DCS, and said TCF is fixed up to two;
   if no signal is received within said second waiting time after a second time redelivery of said NSS, said TSI, said DCS, and said TCF, in other words, after a third time transmission of said NSS, said TSI, said DCS, and said TCF, said transmission side transmits said DCN;
   when said first independent signal was received within said second waiting time after transmitting said TCF, said transmission side waits further for said CFR or said first independent signal during said second waiting time;
   if no signal is received within said second waiting time after receiving said first independent signal, said transmission side transmits said DCN;
   when said CFR was received either within said second waiting time after transmitting said TCF, or within said second waiting time after receiving said first independent signal, said transmission side transmits repeatedly a second independent signal with a predetermined second redelivery interval for a purpose to notify said reception side to the effect that said CFR was correctly detected, that image data is in the process of preparing transmission, and that communication between said transmission side and said reception side is in ongoing;
   when the preparation for transmission of said image data is completed, either said transmission side transmits said image data after completing transmission of said second independent signal if it is in the course of the transmission, or said transmission side transmits immediately said image data if said second independent signal is not in the course of the transmission; and when said preparation for transmission of said image data was not completed within said predetermined first waiting time after receiving said CFR, said transmission side transmits said DCN.

6. A facsimile communication method as claimed in claim 5, wherein:
said second redelivery interval of said second independent signal is sufficiently shorter than a redelivery interval of a binary code signal in a standard facsimile transmission procedure.

7. A facsimile communication method as claimed in claim 6, wherein:
in said independent transmission procedure, the reception side waits for said image data after transmitting said CFR from said reception side, but when said second independent signal was received within a predetermined fourth waiting time after transmitting said CFR, said reception side waits further for either said image data or said second independent signal for said fourth waiting time;
if no signal is received within said fourth waiting time after transmitting said CFR, said reception side redelivers said CFR after a lapse of said fourth waiting time;
the number of times for redelivery of said CFR is fixed up to two;
if said second independent signal or said image data is not received within said fourth waiting time after a second time redelivery of said CFR, in other words, after a third time transmission of said CFR, said reception side transmits said DCN; and
when said second independent signal or said image data is not received within said fourth waiting time after receiving said second independent signal within said fourth waiting time after transmission of said CFR, said reception side transmits said DCN.

8. A facsimile communication method as claimed in claim 7, wherein:
in said independent transmission procedure, the transmission side transmits a post message signal after transmitting said image data;
when said post message signal is received after receiving said image data, the reception side transmits repeatedly said first independent signal with said first redelivery interval for a purpose to notify said transmission side to the effect that said image data and said post message signal were correctly detected, that a message confirmation signal MCF (hereinafter referred simply to as "MCF") is in the process of preparing transmission, and that communication between said transmission side and said reception side is in ongoing; and
when the preparation for transmission of said MCF is completed, said reception side transmits said MCF after completing transmission of said first independent signal in the case where it is in the process of transmission, or said reception side transmits immediately said MCF in the case where said first independent signal is not in the process of transmission.

9. A facsimile communication method as claimed in claim 8, wherein:
in said independent transmission procedure, the transmission side waits for said, MCF or said first independent signal within a second waiting time after transmitting said post message signal, but if no signal was received within said second waiting time after delivering said post message signal, said transmission side redelivers said post message signal;
the number of times for redelivery of said post message signal is fixed up to two;
if said MCF is not received within said second waiting time after a second time redelivery of said post message signal, in other words, after a third time transmission of said post message signal, said transmission side transmits said DCN;
if said post message signal is a multipage signal MPS (hereinafter referred simply to as "MPS"), the transmission side waits further for said first independent signal or said MCF during said second waiting time in the case when said first independent signal was received within said second waiting time after transmitting said MPS;
said transmission side transmits said DCN in the case where no signal is received within said second waiting time after receiving said first independent signal;
if said post message signal is an end of procedure signal EOP (hereinafter referred simply to as "EOP") or an end of message signal EOM (hereinafter referred simply to as "EOM"), the transmission side waits further for said first independent signal or said MCF during said fourth waiting time in the case when said first independent signal was received within said second waiting time after transmitting said EOP or said EOM; and
when no signal is received within said fourth waiting time after receiving said first independent signal, the transmission side transmits said DCN.

10. A facsimile communication method as claimed in claim 9, wherein:
in said independent transmission procedure, if said post message signal is said EOP, a phase D procedure based on said Recommendation is conducted on and after said MCF was transmitted from the reception side, and the MCF thus transmitted was received by the transmission side; more specifically, said reception side waits for said DCN within said second waiting time after transmitting said MCF, and when said EOP was received again during waiting for said DCN, the reception side redelivers said MCF, while said transmission side transmits said DCN after receiving said MCF.

11. A facsimile communication method as claimed in claim 10, wherein:
in said independent transmission procedure, if said post message signal is said MPS, the transmission side transmits repeatedly said second independent signal with said second redelivery interval for a purpose to notify the reception side to the effect that MCF was correctly detected by said transmission side after receiving said MCF, that image data is in the process of preparing transmission, and that communication between said transmission side and said reception side is in ongoing;
when the preparation for transmission of said image data is completed, said transmission side transmits said image data after completing transmission of said second independent signal in the case where it is in the process of transmission, or the transmission side transmits immediately said image data in the case where it is not in the process of transmission; and
if the preparation for transmission of said image data was not completed within said first waiting time after receiving said MCF, said transmission side transmits said DCN.

12. A facsimile communication method as claimed in claim 11, wherein:

in said independent transmission procedure, if said post message signal is said MPS, the reception side waits for said image data after transmitting said MCF, but when said second independent signal was received within said fourth waiting time after transmitting said MCF, said reception side waits further for said image data or said second independent signal during said fourth waiting time;

if said second independent signal or said image data is not received within said fourth waiting time after transmitting said MCF, said reception side redelivers said MCF again;

the number of times for redelivery of said MCF is fixed up to two;

if said second independent signal of said image data is not received within said fourth waiting time after a second time redelivery of said MCF, in other word, after a third time transmission of said MCF, said reception side transmits said DCN; and if said second independent signal or said image data is not received within said fourth waiting time after receiving said second independent signal within said fourth waiting time after said MCF was transmitted, said reception side transmits said DCN.

13. A facsimile communication method as claimed in claim 12, wherein:

in said independent transmission procedure, if said post message signal is said EOM, the reception side prepares for transmission of said NSF, said CSI, and said DIS after transmitting said MCF to transmit these signals after completing the preparation;

when said EOM is received again within a predetermined third waiting time after transmitting said MCF before transmission of said NSF, said CSI, and said DIS, the reception side transmits again said MCF;

if a preparation for transmission of said NSF, said CSI, and said DIS is not completed within said predetermined third waiting time after transmitting said MCF, said reception side transmits said DCN;

said transmission side waits for said NSF, said CSI, and said DIS during said first waiting time after receiving said MCF; and if these signals are not received within said first waiting time, said transmission side transmits said DCN.

14. A facsimile communication method being a non-standard facsimile communication method, which is based on ITU-T recommendation T-30 and executed by the use of a non-standard facilities signal NSF (hereinafter referred simply to as "NSF") and a non-standard facilities set-up signal NSS (hereinafter referred simply to as "NSS"), comprising the steps of:

adding independent transmission procedure capability information to said NSF and said NSS;

transmitting said NSS including said independent transmission procedure capability information in the case when said NSF including said independent transmission procedure capability information is detected by a transmission side; and implementing an independent transmission procedure between both transmission and reception sides after detecting said NSS by the reception side, wherein in said independent transmission procedure, a time for delivering preamble signals added to all the binary codes to be used in a facsimile communication procedure is reduced to a predetermined time, which is shorter than that defined by said Recommendation, on and after said NSF including said independent transmission procedure capability information transmitted from the reception side was correctly discriminated by said transmission side as well as on and after said NSS including said independent transmission procedure capability information transmitted from the transmission side was correctly discriminated by said reception side, and wherein in said independent transmission procedure, after said NSF including said independent transmission procedure capability information, a called subscriber identification signal CSI (hereinafter referred simply to as "CSI"), and a digital identification signal DIS (hereinafter referred simply to as "DIS") transmitted from the reception side were correctly discriminated by the transmission side as well as after said NSS including said independent transmission procedure capability information, a transmitting subscriber identification signal TSI (hereinafter referred simply to as "TSI"), a digital command signal DCS (hereinafter referred simply to as "DCS"), and a training check signal TCF (hereinafter referred simply to as "TCF"), which are returned from the transmission side to the reception side with respect to the signals transmitted from said reception side were correctly discriminated by the reception side, said reception side transmits repeatedly a first independent signal with a predetermined first redelivery interval for a purpose to notify said transmission side to the effect that said signals were correctly detected by the reception side, that a confirmation to receive signal CFR (hereinafter referred simply to as "CFR") is in the process of preparing transmission, and that communication between said transmission side and said reception side is in ongoing;

when the preparation for transmission of said CFR is completed, either the reception side transmits said CFR after transmission was completed if said first independent signal is in the process of the transmission, or said reception side transmits immediately said CFR if said first independent signal is not in the process of the transmission; and said reception side transmits a disconnect signal DCN (hereinafter referred simply to as "DCN") in the case where said preparation for transmission of said CFR is not completed within a predetermined first waiting time.

15. A facsimile communication method as claimed in claim 14, wherein:

said first redelivery interval of said first independent signal is sufficiently shorter than a redelivery interval of a binary code signal in a standard facsimile transmission procedure.

16. A facsimile communication method as claimed in claim 15, wherein:

in said independent transmission procedure, the transmission side waits for said CFR signal after transmitting said TCF from said transmission side, but if no signal is received within a predetermined second waiting time after transmitting said TCF, said transmission side redelivers said NSS, said TSI, said DCS, and said TCF;

the number of times for redelivery of said NSS, said TSI, said DCS, and said TCF is fixed up to two;

if no signal is received within said second waiting time after a second time redelivery of said NSS, said TSI, said DCS, and said TCF, in other words, after a third time transmission of said NSS, said TSI, said DCS, and said TCF, said transmission side transmits said DCN;

when said first independent signal was received within said second waiting time after transmitting said TCF, said transmission side waits further for said CFR or said first independent signal during said second waiting time;

if no signal is received within said second waiting time after receiving said first independent signal, said transmission side transmits said DCN;

when said CFR was received either within said second waiting time after transmitting said TCF, or within said second waiting time after receiving said first independent signal, said transmission side transmits repeatedly a second independent signal with a predetermined second redelivery interval for a purpose to notify said reception side to the effect that said CFR was correctly detected, that image data is in the process of preparing transmission, and that communication between said transmission side and said reception side is in ongoing;

when the preparation for transmission of said image data is completed, either said transmission side transmits said image data after completing transmission of said second independent signal if it is in the course of the transmission, or said transmission side transmits immediately said image data if said second independent signal is not in the course of the transmission; and when said preparation for transmission of said image data was not completed within said predetermined first waiting time after receiving said CFR, said transmission side transmits said DCN.

17. A facsimile communication method as claimed in claim 16, wherein:

said second redelivery interval of said second independent signal is sufficiently shorter than a redelivery interval of a binary code signal in a standard facsimile transmission procedure.

18. A facsimile communication method as claimed in claim 17, wherein:

in said independent transmission procedure, the reception side waits for said image data after transmitting said CFR from said reception side, but when said second independent signal was received within a predetermined fourth waiting time after transmitting said CFR, said reception side waits further for either said image data or said second independent signal for said fourth waiting time;

if no signal is received within said fourth waiting time after transmitting said CFR, said reception side redelivers said CFR after a lapse of said fourth waiting time;

the number of times for redelivery of said CFR is fixed up to two;

if said second independent signal or said image data is not received within said fourth waiting time after a second time redelivery of said CFR, in other words, after a third time transmission of said CFR, said reception side transmits said DCN; and when said second independent signal or said image data is not received within said fourth waiting time after receiving said second independent signal within said fourth waiting time after transmission of said CFR, said reception side transmits said DCN.

19. A facsimile communication method as claimed in claim 18, wherein:

in said independent transmission procedure, the transmission side transmits a post message signal after transmitting said image data;

when said post message signal is received after receiving said image data, the reception side transmits repeatedly said first independent signal with said first redelivery interval for a purpose to notify said transmission side to the effect that said image data and said post message signal were correctly detected, that a message confirmation signal MCF (hereinafter referred simply to as "MCF") is in the process of preparing transmission, and that communication between said transmission side and said reception side is in ongoing; and when the preparation for transmission of said MCF is completed, said reception side transmits said MCF after completing transmission of said first independent signal in the case where it is in the process of transmission, or said reception side transmits immediately said MCF in the case where said first independent signal is not in the process of transmission.

20. A facsimile communication method as claimed in claim 19, wherein:

in said independent transmission procedure, the transmission side waits for said MCF or said first independent signal within a second waiting time after transmitting said post message signal, but if no signal was received within said second waiting time after delivering said post message signal, said transmission side redelivers said post message signal;

the number of times for redelivery of said post message signal is fixed up to two;

if said MCF is not received within said second waiting time after a second time redelivery of said post message signal, in other words, after a third time transmission of said post message signal, said transmission side transmits said DCN;

if said post message signal is a multipage signal MPS (hereinafter referred simply to as "MPS"), the transmission side waits further for said first independent signal or said MCF during said second waiting time in the case when said first independent signal was received within said second waiting time after transmitting said MPS;

said transmission side transmits said DCN in the case where no signal is received within said second waiting time after receiving said first independent signal;

if said post message signal is an end of procedure signal EOP (hereinafter referred simply to as "EOP") or an end of message signal EOM (hereinafter referred simply to as "EOM"), the transmission side waits further for said first independent signal or said MCF during said fourth waiting time in the case when said first independent signal was received within said second waiting time after transmitting said EOP or said EOM; and when no signal is received within said fourth waiting time after receiving said first independent signal, the transmission side transmits said DCN.

21. A facsimile communication method as claimed in claim 20, wherein:

in said independent transmission procedure, if said post message signal is said EOP, a phase D procedure based on said Recommendation is conducted on and after said MCF was transmitted from the reception side, and the MCF thus transmitted was received by the transmission side; more specifically, said reception side waits for said DCN within said second waiting time after transmitting said MCF, and when said EOP was received again during waiting for said DCN, the reception side redelivers said MCF, while said transmission side transmits said DCN after receiving said MCF.

22. A facsimile communication method as claimed in claim 21, wherein:
- in said independent transmission procedure, if said post message signal is said MPS, the transmission side transmits repeatedly said second independent signal with said second redelivery interval for a purpose to notify the reception side to the effect that MCF was correctly detected by said transmission side after receiving said MCF, that image data is in the process of preparing transmission, and that communication between said transmission side and said reception side is in ongoing;
- when the preparation for transmission of said image data is completed, said transmission side transmits said image data after completing transmission of said second independent signal in the case where it is in the process of transmission, or the transmission side transmits immediately said image data in the case where it is not in the process of transmission; and
- if the preparation for transmission of said image data was not completed within said first waiting time after receiving said MCF, said transmission side transmits said DCN.

23. A facsimile communication method as claimed in claim 22, wherein:
- in said independent transmission procedure, if said post message signal is said MPS, the reception side waits for said image data after transmitting said MCF, but when said second independent signal was received within said fourth waiting time after transmitting said MCF, said reception side waits further for said image data or said second independent signal during said fourth waiting time;
- if said second independent signal or said image data is not received within said fourth waiting time after transmitting said MCF, said reception side redelivers said MCF again; the number of times for redelivery of said MCF is fixed up to two;
- if said second independent signal or said image data is not received within said fourth waiting time after a second time redelivery of said MCF, in other words, after a third time transmission of said MCF, said reception side transmits said DCN; and
- if said second independent signal or said image data is not received within said fourth waiting time after receiving said second independent signal within said fourth waiting time after said MCF was transmitted, said reception side transmits said DCN.

24. A facsimile communication method as claimed in claim 23, wherein:
- in said independent transmission procedure, if said post message signal is said EOM, the reception side prepares for transmission of said NSF, said CSI, and said DIS after transmitting said MCF to transmit these signals after completing the preparation;
- when said EOM is received again within a predetermined third waiting time after transmitting said MCF before transmission of said NSF, said CSI, and said DIS, the reception side transmits again said MCF;
- if a preparation for transmission of said NSF, said CSI, and said DIS is not completed within said predetermined third waiting time after transmitting said MCF, said reception side transmits said DCN;
- said transmission side waits for said NSF, said CSI, and said DIS during said first waiting time after receiving said MCF; and
- if these signals are not received within said first waiting time, said transmission side transmits said DCN.

* * * * *